United States Patent
Kwon et al.

(10) Patent No.: US 9,839,047 B2
(45) Date of Patent: Dec. 5, 2017

(54) METHODS FOR CHANNEL SOUNDING AND SCHEDULING FOR INTERFERENCE ALIGNMENT IN WIRELESS LOCAL AREA NETWORK

(71) Applicant: Electronics and Telecommunications Research Institute, Daejeon (KR)

(72) Inventors: Hyoung Jin Kwon, Daejeon (KR); Sok Kyu Lee, Daejeon (KR); Jae Seung Lee, Daejeon (KR); Min Ho Cheong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 350 days.

(21) Appl. No.: 14/561,043

(22) Filed: Dec. 4, 2014

(65) Prior Publication Data

US 2015/0156794 A1   Jun. 4, 2015

(30) Foreign Application Priority Data

Dec. 4, 2013  (KR) .................. 10-2013-0150184
Nov. 24, 2014 (KR) .................. 10-2014-0164420

(51) Int. Cl.
*H04W 72/12* (2009.01)
*H04L 25/02* (2006.01)
*H04L 1/00* (2006.01)
*H04W 84/12* (2009.01)
*H04W 74/00* (2009.01)

(52) U.S. Cl.
CPC .......... *H04W 72/1231* (2013.01); *H04L 1/00* (2013.01); *H04L 25/0224* (2013.01); *H04W 74/00* (2013.01); *H04W 84/12* (2013.01)

(58) Field of Classification Search
None
See application file for complete search history.

(56) References Cited

U.S. PATENT DOCUMENTS

| | | |
|---|---|---|
| 2010/0227613 A1 | 9/2010 | Kim et al. |
| 2010/0265813 A1 | 10/2010 | Pereira et al. |
| 2013/0267240 A1 | 10/2013 | Fu |
| 2013/0267266 A1 | 10/2013 | Park et al. |
| 2016/0183162 A1* | 6/2016 | Jeong ............... H04W 40/22 370/311 |

* cited by examiner

*Primary Examiner* — Sulaiman Noonistany

(57) ABSTRACT

Provided are channel sounding and scheduling methods for interference alignment in a wireless LAN. The sounding method includes transmitting a RTS frame, the RTS frame including an OIA candidate AP list that includes identification information of a plurality of access points, transmitting a CTS poll frame for triggering transmission of a CTS frame to a second access point which is a first access point in the OIA candidate AP list, and receiving a CTS frame which is a response to the CTS poll frame from the second access point. Therefore, communication performance of the wireless LAN can be improved.

6 Claims, 13 Drawing Sheets

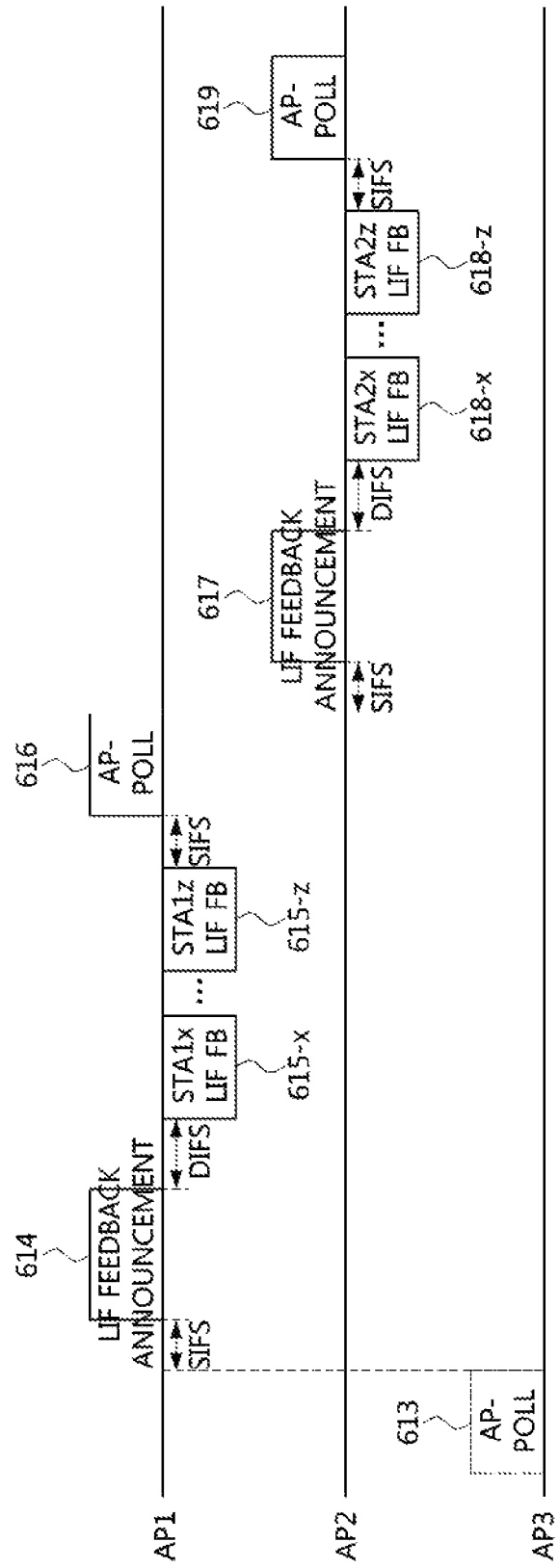

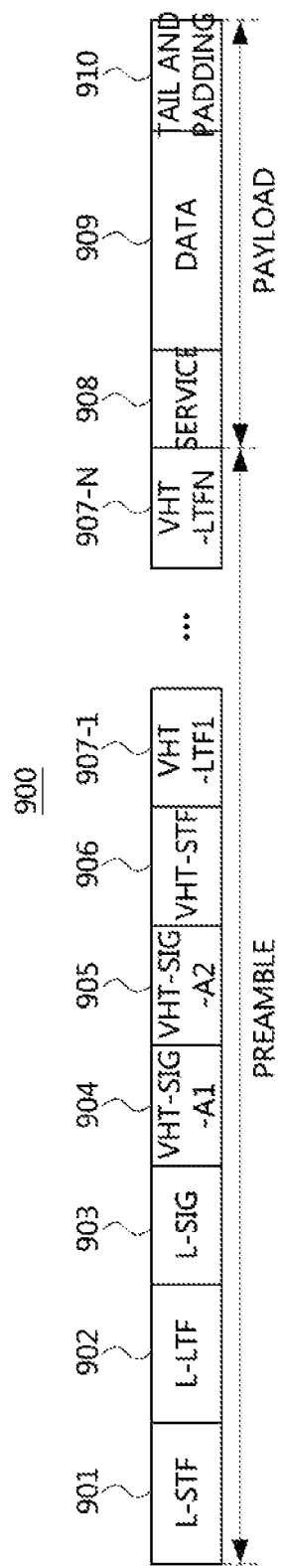

METHODS FOR CHANNEL SOUNDING AND SCHEDULING FOR INTERFERENCE ALIGNMENT IN WIRELESS LOCAL AREA NETWORK

CLAIM FOR PRIORITY

This application claims priority to Korean Patent Application No. 2013-0150184 filed on Dec. 4, 2013 and No. 2014-0164420 filed on Nov. 24, 2014 in the Korean Intellectual Property Office (KIPO), the entire contents of which are hereby incorporated by reference.

BACKGROUND

1. Technical Field

Example embodiments of the present invention relate to a wireless LAN technology, and more specifically, relate to channel sounding and scheduling technologies for interference alignment.

2. Related Art

A variety of wireless communication technologies have been developed with the development of information and communication technology. Among them, a wireless local area network (WLAN) is a technology that enables wireless access to the Internet in home, a company or a specific service area using a portable terminal such as a personal digital assistant (PDA), a laptop computer, a portable multimedia player (PMP), a smart phone, or a tablet PC based on a radio frequency technology.

A standard of the wireless LAN technology is developed as the Institute of Electrical and Electronics Engineers (IEEE) 802.11 standard. A wireless LAN technology according to the IEEE 802.11a standard operates based on an orthogonal frequency division multiplexing (OFDM) scheme, and may provide a transmission rate of up to 54 Mbps in a 5 GHz band. A wireless LAN technology according to the IEEE 802.11b standard operates based on a direct sequence spread spectrum (DSSS) scheme and may provide a transmission rate of up to 11 Mbps in a 2.4 GHz band. A wireless LAN technology according to the IEEE 802.11g standard operates based on an OFDM scheme or a DSSS scheme and may provide a transmission rate of up to 54 Mbps in a 2.4 GHz band.

A wireless LAN technology according to the IEEE 802.11n standard operates in a 2.4 GHz band and a 5 GHz band based on an OFDM scheme. When a multiple input multiple output-OFDM (MIMO-OFDM) scheme is used, a transmission rate of a maximum of 300 Mbps can be provided for four spatial streams. The wireless LAN technology according to the IEEE 802.11n standard may support a channel bandwidth up to 40 MHz. In this case, a transmission rate of a maximum of 600 Mbps can be provided.

As the spread of such a wireless LAN is activated and applications using this are diversified, there is an increasing need for a new wireless LAN technology for supporting a higher throughput than a data transaction rate supported by IEEE 802.11n. A very high throughput (VHT) wireless LAN technology is one of IEEE 802.11 wireless LAN technologies proposed to support a data transaction rate of 1 Gbps or more. Among them, IEEE 802.11ac is developed as a standard for providing a very high throughput in a band of 5 GHz or less, and IEEE 802.11ad is developed as a standard for providing a very high throughput in a 60 GHz band.

A plurality of basic service sets (BSSs) are highly likely to be overlapped and interfered with each other as use of the wireless LAN recently increases. Accordingly, communication performance may be degraded in an overlapped basic service set (OBSS).

SUMMARY

Accordingly, example embodiments of the present invention are provided to substantially obviate one or more problems due to limitations and disadvantages of the related art.

Example embodiments of the present invention provide a channel sounding method for opportunistic interference alignment.

Example embodiments of the present invention also provide a scheduling method for opportunistic interference alignment.

Example embodiments of the present invention also provide a method of transmitting and receiving a data frame based on opportunistic interference alignment.

In some example embodiments, a determining method for a signal sub-space OIA performed in a first access point may include transmitting an RTS frame, the RTS frame including an OIA candidate AP list that may include identification information of a plurality of access points; transmitting a CTS-poll frame for triggering transmission of a CTS frame to a second access point which is a first access point in the OIA candidate AP list; and receiving the CTS frame which is a response to the CTS-poll frame from the second access point.

Here, the determining method may further include generating an OIA participation AP list including identification information of each of a plurality of access points transmitting a CTS frame.

Here, the RTS frame may further include information indicating an interference sub-space of each of the plurality of access points.

Here, the CTS frame may further include information indicating a signal sub-space of the second access point.

Here, the determining method may further include transmitting an NDP announcement frame, the NDP announcement frame including an OIA participation AP list that may include identification information of each of a plurality of access points participating in OIA; transmitting an NDP frame; transmitting an AP-poll frame for triggering sounding of the second access point which is a first access point in the OIA participation AP list to the second access point; receiving the AP-poll frame indicating that sounding is completed from an N-th access point which is a last access point in the OIA participation AP list.

Here, the NDP announcement frame may further include information indicating a signal sub-space of each of the plurality of access points participating in OIA.

In other example embodiments, a scheduling method for OIA performed in a first access point may include: transmitting a leakage of interference (LIF) feedback announcement frame including information indicating a range of leakage of interference; receiving an LIF feedback frame from at least one terminal having a leakage of interference belonging to the range of leakage of interference among a plurality of terminals connected with the first access point; transmitting an AP-poll frame for triggering LIF feedback of a second access point to the second access point, the second access point being a first access point in an OIA participation AP list including identification information of each of a plurality of access points participating in OIA; and receiving an AP-poll frame indicating that LIF feedback is completed from an N-th access point which is a last access point in the OIA participation AP list.

Here, the LIF feedback announcement frame may further include information indicating a period set to receive the LIF feedback frame.

Here, the LIF feedback frame may include a sum of leakages of interference to the plurality of access points included in the OIA participation AP list, in addition to the first access point.

Here, the LIF feedback frame may include a leakage of interference of each of the plurality of access points included in the OIA participation AP list, in addition to the first access point.

Here, the LIF feedback frame may include information indicating a size of uplink data to be transmitted by a terminal.

Here, the LIF feedback frame is transmitted in a broadcast manner.

Here, a preamble of the LIF feedback frame is omnidirectionally transmitted.

Here, a payload of the LIF feedback frame is transmitted in a beamforming manner.

Here, the scheduling method may further include generating an OIA candidate STA list including identification information of at least one candidate terminal participating in OIA based on interference related information of each of a plurality of terminals connected to the first access point; receiving an OIA candidate STA list including identification information of at least one candidate terminal participating in OIA from each of the plurality of access points included in the OIA participation AP list; generating an OIA participation STA list including identification information of at least one last terminal participating in OIA based on the to interference related information of each of the plurality of candidate terminals included in the OIA candidate STA list generated in the first access point and the OIA candidate STA list received from each of the plurality of access points included in the OIA participation AP list; and transmitting the OIA participation STA list to each of the plurality of access points included in the OIA participation AP list.

Here, the interference related information may include at least one of a leakage of interference and an SINR.

In still other example embodiments, a data frame reception method based on OIA performed in a first access point includes transmitting an RTS frame; receiving a CTS frame which is a response to the RTS frame from each of a plurality of access points participating in OIA; transmitting an OIA STA announcement frame including an OIA participation STA list including identification information of each of a plurality of terminals participating in OIA; receiving a data frame from at least one terminal connected to the first access point among the plurality of terminals included in the OIA participation STA list; and transmitting an acknowledgement (ACK) frame which is a response to the data frame to at least one terminal connected to the first access point.

Here, the RTS frame may include identification information of at least one access point participating in OIA.

Here, the OIA STA announcement frame may include information indicating a length of a data frame capable of being transmitted by each of a plurality of terminals participating in OIA.

Here, a precoding matrix acquired based on downlink channel information estimated according to channel reciprocity may be applied to the ACK frame.

According to example embodiments of the present invention, it is possible to improve communication performance of the wireless LAN.

BRIEF DESCRIPTION OF DRAWINGS

Example embodiments of the present invention will become more apparent by describing in detail example embodiments of the present invention with reference to the accompanying drawings, in which:

FIGS. 8A and 8B are conceptual diagrams illustrating a method of feeding back a leakage of interference.

FIG. 9 is a block diagram illustrating one example embodiment of an LIF feedback frame.

DESCRIPTION OF EXAMPLE EMBODIMENTS

Figure 1:
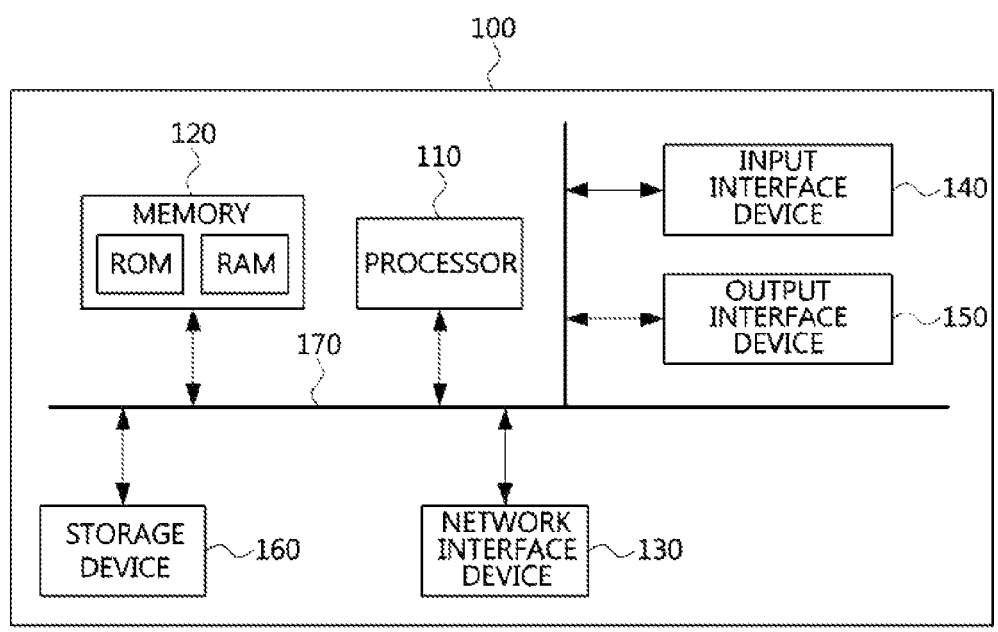
FIG. 1 is a block diagram illustrating one example embodiment of a station that performs methods according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific example embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in greater detail with reference to the accompanying drawings. In order to facilitate general understanding in describing the present invention, the same components in the drawings are denoted with the same reference signs, and repeated description thereof will be omitted.

Throughout this disclosure, a station (STA) may be an arbitrary functional medium including a medium access control (MAC) conforming to regulations of the Institute of Electrical and Electronics Engineers (IEEE) 802.11 standard, and a physical layer interface for a wireless medium. The station may be classified as a station (STA) which is an access point (AP) and a station (STA) which is a non-access point (non-AP). The station (STA) which is the access point (AP) may be simply referred to as an access point (AP), and the station (STA) which is the non-access point (non-AP) may be simply referred to as a terminal.

The station (STA) may include a processor and a transceiver, and may further include a user interface, a display device and the like. The processor may be a unit designed to generate a frame to be transmitted over a wireless network or process a frame received over the wireless network, and may perform various functions for controlling the station (STA). The transceiver is a unit functionally connected with the processor, and designed to transmit and receive a frame over the wireless network for the station (STA).

The access point (AP) may refer to a centralized controller, a base station (BS), a radio access station, node B, evolved node B, a relay, a mobile multihop relay (MMR)-BS, a base transceiver system (BTS), a site controller, or the like, and may include some or all of functions of them.

The terminal (that is, the non-AP) may refer to a wireless transmit/receive unit (WTRU), user equipment (UE), a user terminal (UT), an access terminal (AT), a mobile station (MS), a mobile terminal, a subscriber unit, a subscriber station (SS), a wireless device, a mobile subscriber unit, or the like, and may include some or all of functions of them.

Here, the terminal may be a desktop computer, a laptop computer, a tablet PC, a wireless phone, a mobile phone, a smart phone, a smart watch, a smart glass, an e-book reader, a portable multimedia player (PMP), a portable game machine, a navigation device, a digital camera, a digital multimedia broadcasting (DMB) player, a digital audio recorder, a digital audio player, a digital picture recorder, a digital picture player, a digital video recorder, a digital video player, etc. which can perform communication.

FIG. 1 is a block diagram illustrating an example embodiment of a station performing methods of an example embodiment of the present invention.

Referring to FIG. 1, a station 100 may include at least one processor 110, a memory 120 and a network interface device 130 connected to a network and performing communication. Further, the station 100 may include an input interface device 140, an output interface device 150, and a storage device 160. The respective components included in the station 100 may be connected via a bus 170 to communicate with each other.

The processor 110 may perform a program command stored in the memory 120 and/or the storage device 160. The processor 110 may be a central processing unit (CPU), a graphics processing unit (GPU) or a dedicated processor in which the methods according to an example embodiment of the present invention are performed. The memory 120 and the storage device 160 may include a volatile storage medium and/or a nonvolatile storage medium. For example, the memory 120 may include a read only memory (ROM) and/or a random access memory (RAM).

The example embodiments of the present invention are applied to a wireless LAN system according to IEEE802.11. The example embodiments of the present invention may be applied to other communication systems, as well as the wireless LAN system according to IEEE802.11.

For example, the example embodiments of the present invention may be applied to a mobile Internet such as a wireless personal area network (WPAN), a wireless body area network (WBAN), a wireless broadband internet (Wi-Bro) or a world interoperability for microwave access (Wi-Max), a 2G mobile communication network such as global system for mobile communication (GSM) or code division multiple access (CDMA), a 3G mobile communication network such as wideband code division multiple access (WCDMA) or cdma2000, a 3.5G mobile communication network such as high speed downlink packet access (HSDPA) or high speed uplink packet access (HSUPA), a 4G mobile communication network such as long term evolution (LTE) or LTE-Advanced, a 5G mobile communication network, or the like.

Figure 2:
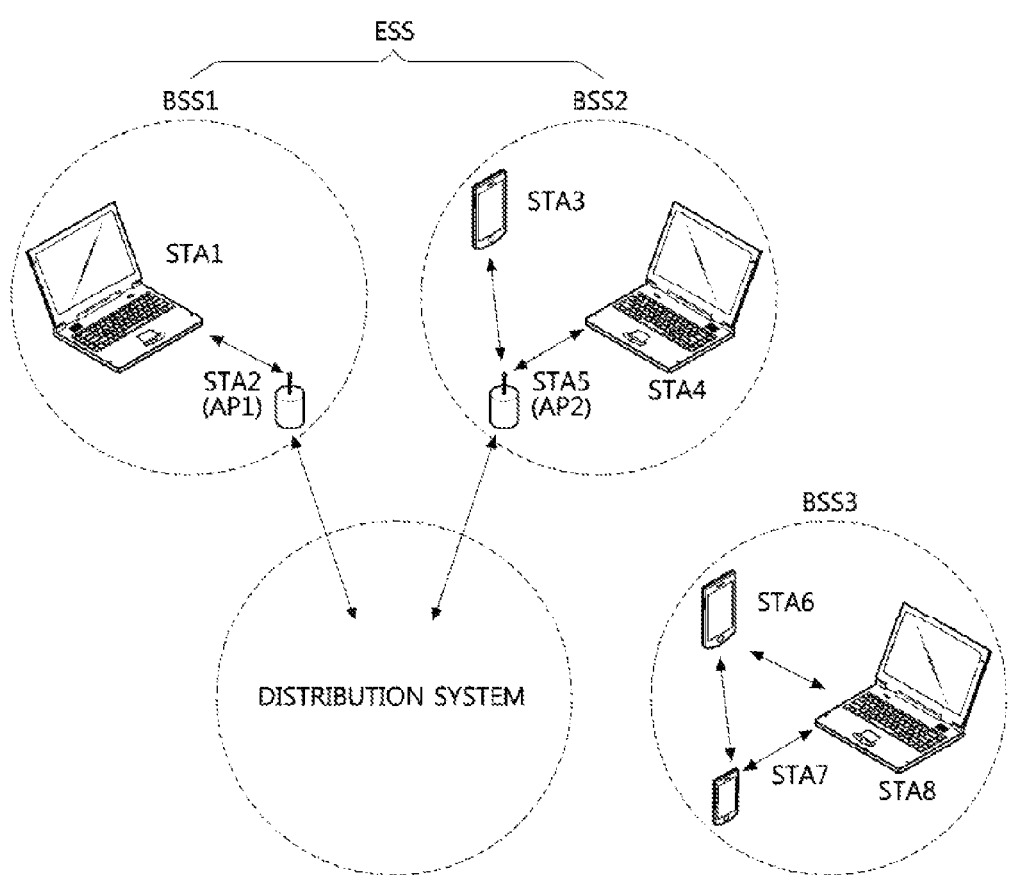
FIG. 2 is a conceptual diagram illustrating one example embodiment of a configuration of a wireless LAN system according to IEEE 802.11.

FIG. 2 is a conceptual diagram illustrating an example embodiment of a configuration of the wireless LAN system according to IEEE 802.11.

Referring to FIG. 2, the wireless LAN system according to IEEE802.11 may include at least one basic cable service set (BSS). The BSS refers to a set of stations STA1, STA2 (AP1), STA3, STA4, STA5 (AP2), STA6, STA7, and STA8 which may communicate with each other through synchronization, and does not refer to a concept indicating a specific area.

The BSS may be classified into an infrastructure BSS and an independent BSS (IBSS). Here, BSS1 and BSS2 are infrastructure BSSs, and BSS3 is an IBSS.

BSS1 may include a first terminal STA1, a first access point STA2 (AP1) that provides distribution service, and a distribution system DS that connects a plurality of access points STA2 (AP1) and STA5 (AP2). In BSS1, the first access point STA2 (AP1) may manage the first terminal STA1.

BSS2 may include a third terminal STA3, a fourth terminal STA4, a second access point STA5 (AP2) that provides distribution service, and the distribution system DS that connects a plurality of access points STA2 (AP1) and STA5 (AP2). In BSS2, the second access point STA5 (AP2) may manage the third terminal STA3 and the fourth terminal STA4.

BSS3 is IBSS operating in an ad-hoc mode. In BSS3, there is no access point which is a centralized management entity that performs a management function at a center. That is, in BSS3, terminals STA6, STA7 and STA8 are managed in a distributed manner. In BSS3, all the terminals STA6, STA7 and STA8 may be mobile terminals and form a self-contained network since a connection to the distribution system DS is not allowed.

The access points STA2 (AP1) and STA5 (AP2) may provide a connection to the distribution system DS through a wireless medium for the terminals STA1, STA3 and STA4 connected to the access points. In BSS1 or BSS2, communication between the terminals STA1, STA3, and STA4 is generally performed via the access points STA2 (AP1) and STA5 (AP2), but direct communication between the terminals STA1, STA3, and STA4 can be performed when a direct link is set.

The plurality of infrastructure BSSs may be connected to one another via the distribution system DS. The plurality of BSSs connected via the distribution system DS is called an extended service set (ESS). The entities STA1, STA2 (AP1), STA3, STA4, and STA5 (AP2) included in the ESS may communicate with each other, and any terminals STA1, STA3 and STA4 in the same ESS may move from one BSS to the other BSS while performing seamless communication.

The distribution system DS is a mechanism that enables one access point to communicate with the other access point. According to this mechanism, the access point may transmit a frame for terminals connected to the BSS managed by the access point or for any terminal which has moved to the other BSS. Further, the access point may transmit and receive frames with an external network such as a wired network. This distribution system DS does not have to be a network, and a form thereof is not limited as long as a predetermined distribution service defined in the IEEE802.11 standard can be provided. For example, the distribution system may be a wireless network such as a mesh network or may be a physical structure that connects access points.

Meanwhile, all stations in the wireless LAN may contend in a carrier sense multiple access/collision avoidance (CSMA/CA) scheme to acquire a channel. In the IEEE802.11 standard, CSMA/CA is called a distributed coordinated function (DCF). According to the DCF, the station desiring to acquire a channel may basically contend to obtain a channel connection opportunity under the same conditions. When the station acquires channel connection opportunity, the station may inform neighboring stations of reservation information indicating that the station is going to use the channel through exchange of a request to send (RTS) frame and a clear to send (CTS) frame.

The station may protect transmission of a data frame after a current RTS, and an acknowledgement (ACK) frame which is a response to the data frame through setting of a duration field included in the RTS frame. Each of the neighboring stations receiving the RTS frame may set a network allocation vector (NAV) timer based on the duration field included in the RTS frame and may postpone channel connection until the NAV timer reaches 0. According to DCF, only a station acquiring the channel is permitted to use the channel, and a channel connection of each of other stations may be postponed according to a result of to detection using carrier sensing. That is, since the DCF is a scheme for preventing interference, interference between the stations may increase in an overlapping BSS (OBSS) in which a large number of BSSs are overlapped (particularly, the stations are arranged densely), and performance of the wireless LAN system may be degraded.

Technology for orthogonalizing time resources, technology for orthogonalizing frequency resources, frequency reuse technology, or interference prevention technology such as CSMA/CA may be used to overcome degradation of the performance of the wireless LAN system due to the interference between the stations in the OBSS in which a large number of BSSs are overlapped. There is a difference between actual performance and theoretical performance of such schemes.

Meanwhile, there are various interference management schemes for improving the performance of the wireless LAN system s without using orthogonal resources. Particularly, since an interference management scheme through coordination between BSSs can improve the performance of the wireless LAN system, this scheme has been actively studied. An interference alignment scheme, an interference nulling scheme or the like among interference management schemes need channel information of an adjacent access point.

Only a sounding method using which an access point acquires channel information of a link between an access point and a terminal in one BSS for beamforming or single user/multi user multiple input multiple output (SU/MU MIMO) is defined in an existing wireless LAN. Therefore, a sounding method for acquiring channel information between BSSs, and a method of selecting a terminal to participate in interference alignment through cooperation between access points after acquisition of channel information are necessary.

According to the interference alignment scheme, multiple antennas of each of a plurality of access points and multiple antennas of each of a plurality of terminals may be used to overcome the degradation of the performance of the wireless LAN system due to influence of the interference. Here, a reception station may divide a multi-dimensional signal vector space into a signal sub-space and an interference sub-space, and may cause an interference signal transmitted from an unwanted transmission station to be in the interference sub-space and a signal transmitted from a wanted transmission station to be in the signal sub-space. Accordingly, the reception station can detect the desired signal without being affected by the interference. A method of acquiring channel information between BSSs for application of the interference alignment scheme, and a method of selecting a terminal to which the interference alignment scheme is applied based on channel information are necessary.

That is, a method of acquiring channel information between a terminal and an access point belonging to an adjacent BSS in an OBSS, a scheduling method for selecting at least one terminal for simultaneous transmission through cooperation between a plurality of access points based on acquired channel information, a method of transmitting a signal from a transmission station to a reception station according to an interference alignment scheme based on scheduling information, and a method using which a reception station detects a desired signal from an acquired signal and decodes the signal are necessary. Accordingly, it is possible to mitigate influence of the interference even when the station uses the same time-frequency resources as used by other stations.

Hereinafter, an inter-BSS sounding method, a method of acquiring channel information, a scheduling method for selection of a terminal for simultaneous transmission in a situation of interference between BSSs, a method of providing scheduling information to a terminal, and a method of transmitting and receiving a frame based on an interference alignment scheme or another interference management scheme will be described in detail.

A basic sounding method for MU MIMO defined in the IEEE 802.11ac standard is as follows.

Figure 3:
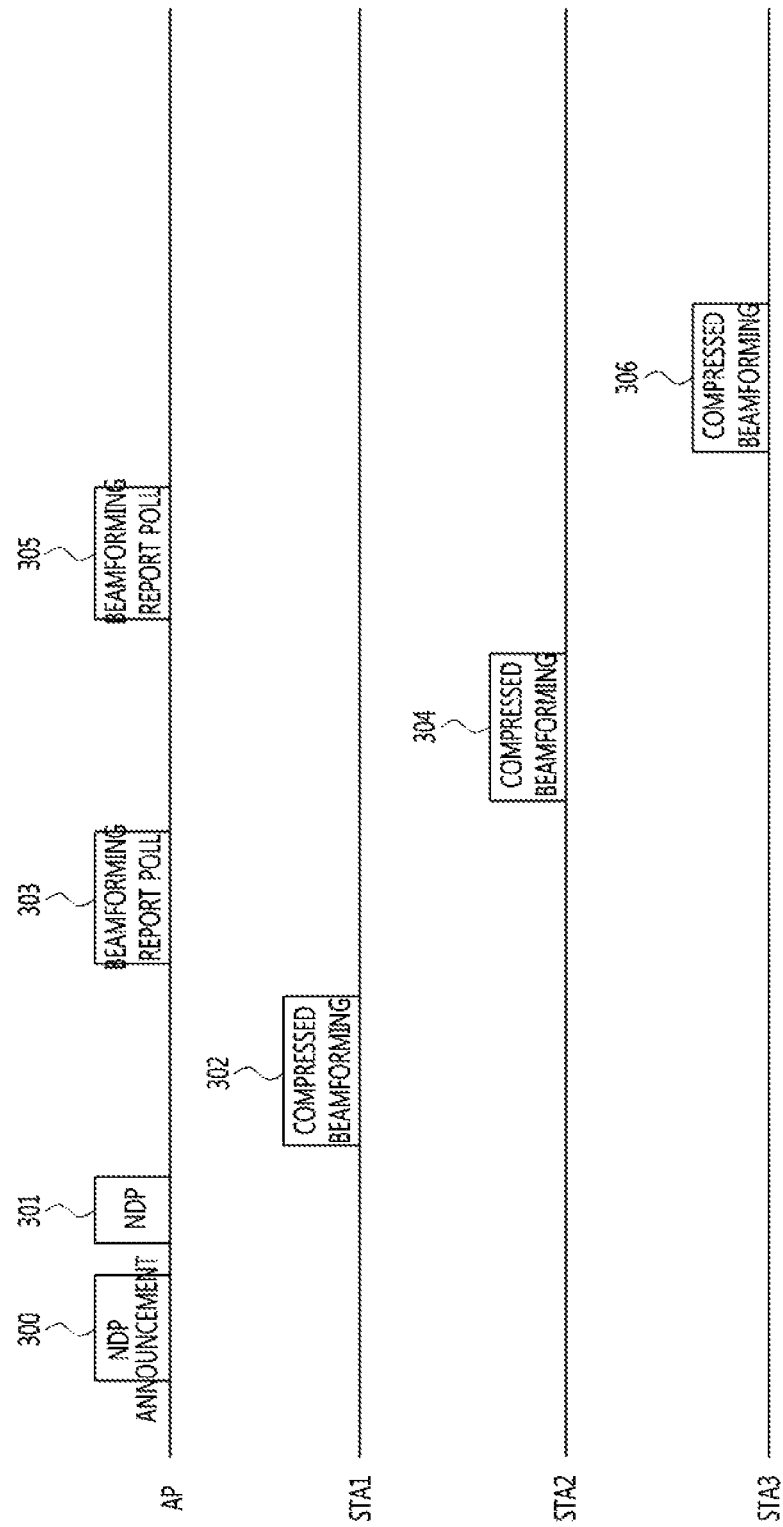
FIG. 3 is a conceptual diagram illustrating a basic sounding method for MU MIMO.

FIG. 3 is a conceptual diagram illustrating a basic sounding method for MU MIMO.

Referring to FIG. 3, an access point AP may constitute a BSS and each of a plurality of terminals STA1, STA2, and STA3 may belong to the BSS. Here, the access point AP may be a beamformer, and each of the plurality of terminals STA1, STA2, and STA3 may be a beamformee.

The access point AP may perform sounding to acquire channel information for each of the plurality of terminals STA1, STA2 and STA3. First, the access point AP may transmit a null data packet (NDP) announcement frame 300 in a broadcast manner. The NDP announcement frame 300 may include at least one STA information field. The STA information field may include identification information (for example, an association identifier (AID) or a partial AID (PAID)) of each of the plurality of terminals STA1, STA2, and STA3 participating in sounding.

Each of the plurality of terminals STA1, STA2, and STA3 receiving the NDP announcement frame 300 may participate in sounding by confirming that its own identification information is included in the STA information field of the NDP announcement frame 300. In this case, each of the plurality of terminals STA1, STA2, and STA3 may confirm an order of transmission of the channel information based on an order in which its own identification information is included in the NDP announcement frame 300.

After transmitting the NDP announcement frame 300, the access point AP may transmit an NDP frame 301. Each of the plurality of terminals STA1, STA2, and STA3 may acquire the channel information based on the received NDP frame 301 and generate compressed beamforming frames 302, 304, and 306 including the channel information.

When the terminal STA1 is set to first transmit the channel information according to an order of the identification information of the plurality of terminals STA1, STA2, and STA3 included in the NDP announcement frame 300, the first terminal STA1 may transmit a compressed beamforming frame 302 including the channel information between the first terminal STA1 and the access point AP to the access point AP1. The access point AP may recognize the channel information between the access point AP and the first terminal STA1 through the compressed beamforming frame 302.

When the second terminal STA2 is set to transmit the channel information subsequently to the first terminal STA 1 according to the order of identification information of the plurality of terminals STA1, STA2, and STA3 included in the NDP announcement frame 300, the access point AP may transmit a beamforming report poll frame 303 to the second terminal STA2 after receiving the compressed beamforming frame 302. When the second terminal STA2 receives the beamforming report poll frame 303, the second terminal STA2 may transmit a compressed beamforming frame 304 including the channel information between the second terminal STA2 and the access point AP to the access point AP. The access point AP may recognize the channel information between the access point AP and the second terminal STA2 through the compressed beamforming frame 304.

When the third terminal STA3 is set to transmit the channel information subsequently to the second terminal STA2 according to the order of identification information of the plurality of terminals STA1, STA2, and STA3 included in the NDP announcement frame 300, the access point AP may transmit a beamforming report poll frame 305 to the third terminal STA3 after receiving the compressed beamforming frame 304. When the third terminal STA3 receives the beamforming report poll frame 305, the third terminal STA3 may transmit a compressed beamforming frame 306 including the channel information between the third terminal STA3 and the access point AP to the access point AP. The access point AP may recognize the channel information between the access point AP and the third terminal STA3 through the compressed beamforming frame 306.

Here, frames having the largest size among the frames 300, 301, 302, 303, 304, 305, and 306 are the compressed beamforming frames (that is, feedback frames) 302, 304, and 306 including the channel information. For example, in the case of 4×4 160 MHz SU MIMO sounding, a size of the feedback frame including the channel information transmitted by each of the plurality of terminals STA1, STA2, and STA3 is about 13 Kbyte. When a lowest modulation and coding scheme (MCS) 0 is used for transmission of the feedback frame of a size of about 13 Kbyte, time resources of about 10 ms are necessary. When a highest MCS9 is used for transmission of the feedback frame of a size of about 13 Kbyte, time resources of about 3 ms are necessary.

As time resources necessary for 8×8 160 MHz MU MIMO sounding, time resources for transmitting a feedback frame of a twice size of the feedback frame for 4×4 160 MHz SU MIMO sounding, and time resources for an overhead according to additional protocol for MU MIMO sounding are necessary. Further, for interference signal processing for the plurality of BSSs, it is necessary for the access point AP to acquire the channel information of the BSS to which the access point AP belongs as well as the channel information of an adjacent BSS. For example, for interference signal processing for three BSSs, it is necessary for the access point AP to acquire the channel information of the BSS to which the access point AP belongs as well as the channel information of two adjacent BSS. Therefore, in the case of 8×8 160 MHz MU MIMO sounding, a feedback frame of a size of six times (which is 2(4×4→8×8)×3(one BSS three BSSs)) the feedback frame size for 4×4 160 MHz SU MIMO sounding is necessary. Here, since time necessary to transmit a feedback frame for 8×8 160 MHz MU MIMO sounding exceeds 5 ms which is a length of TxOP (transmit opportunity), it is necessary to reduce the size of the feedback frame.

Meanwhile, when channel reciprocity between a downlink and an uplink is used, feedback of the channel information may not be performed. This is called implicit sounding, and an implicit sounding method is as follows.

Figure 4:
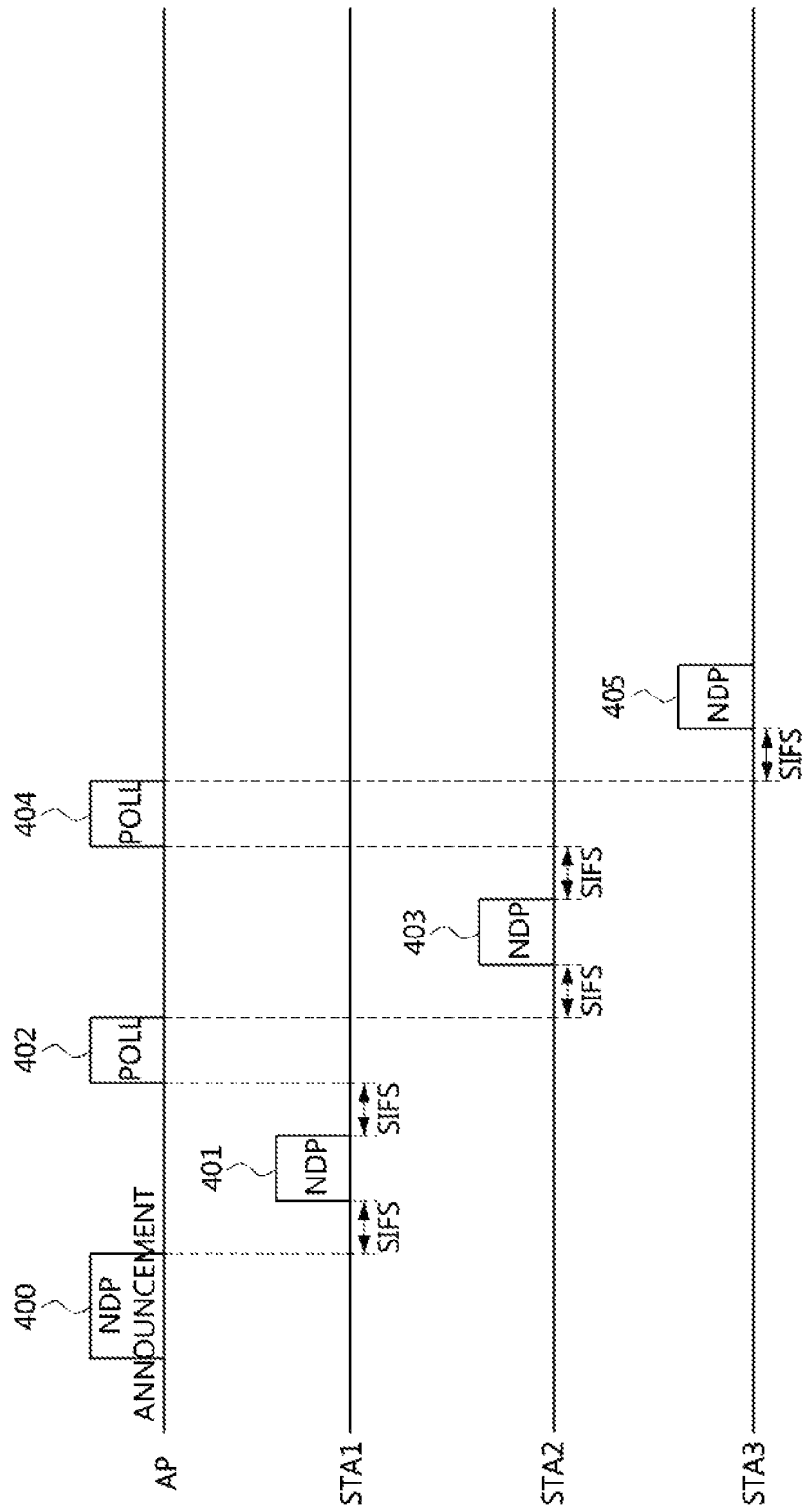
FIG. 4 is a conceptual diagram illustrating an implicit sounding method.

FIG. 4 is a conceptual diagram illustrating the implicit sounding method.

Referring to FIG. 4, an access point AP may constitute a BSS and each of a plurality of terminals STA1, STA2, and STA3 may belong to the BSS. Here, the access point AP may be a beamformer, and each of the terminals STA1, STA2, and STA3 may be a beamformee. Here, the implicit sounding method and the above-described basic sounding method are different in that the plurality of terminals STA1, STA2, and STA3 transmit the NDP frames 401, 403, and 405 in the implicit sounding method, whereas the access point AP transmits the NDP frame 301 in the basic sounding method.

The access point AP may perform sounding to estimate the channel information of each of the plurality of terminals STA1, STA2, and STA3. First, the access point AP may transmit the NDP announcement frame 400 in a broadcast manner. The NDP announcement frame 400 may include at least one STA information field. The STA information field may include identification information (for example, AID or PAID) of the plurality of terminals STA1, STA2, and STA3 participating in a sounding procedure.

Each of the plurality of terminals STA1, STA2, and STA3 receiving the NDP announcement frame 400 may participate in sounding by confirming that its own identification information is included in the STA information field of the NDP announcement frame 400. In this case, each of the plurality of terminals STA1, STA2, and STA3 may confirm an order of transmission of the NDP frames 401, 403, and 405 based on an order in which its own identification information is included in the NDP announcement frame 400.

When the first terminal STA1 is set to first transmit the NDP frame 401 according to the order of identification information of the plurality of terminals STA1, STA2, and STA3 included in the NDP announcement frame 400, the first terminal STA1 may transmit the NDP frame 401 to the access point AP after a short inter frame space (SIFS) from a reception end time of the NDP announcement frame 400. The access point AP may acquire uplink channel information from the first terminal STA1 to the access point AP based on the received NDP frame 401, and estimate the downlink channel information (that is, estimate downlink channel information according to channel reciprocity) from the access point AP to the first terminal STA1 based on the uplink channel information.

When the second terminal STA2 is set to transmit an NDP frame 403 subsequently to the first terminal STA1 according to the order of identification information of the plurality of terminals STA1, STA2, and STA3 included in the NDP announcement frame 400, the access point AP may transmit a poll frame 402 to the second terminal STA2 after SIFS from a reception end time of the NDP frame 401 in order to trigger the transmission of the NDP frame 403.

When a receiver address (RA) of the poll frame 402 indicates the second terminal STA2, the second terminal STA2 may transmit the NDP frame 403 to the access point AP after SIFS from a reception end time of the poll frame 402. The access point AP may acquire uplink channel information from the second terminal STA2 to the access point AP based on the received NDP frame 403, and estimate downlink channel information (that is, estimate the downlink channel information according to channel reciprocity) from the access point AP to the second terminal STA2 based on the uplink channel information.

When the third terminal STA3 is set to transmit an NDP frame 405 subsequently to the second terminal STA2 according to the order of the identification information of the plurality of terminals STA1, STA2, and STA3 included in the NDP announcement frame 400, the access point AP may transmit a poll frame 404 to the third terminal STA3 after SIFS from a reception end time of the NDP frame 403 in order to trigger the transmission of the NDP frame 405.

When a receiver address of the poll frame 404 indicates the third terminal STA3, the third terminal STA3 may transmit the NDP frame 405 to the access point AP after SIFS from a reception end time of the poll frame 404. The access point AP may acquire uplink channel information from the third terminal STA3 to the access point AP based on the received NDP frame 405, and estimate downlink channel information (that is, estimate downlink channel information according to channel reciprocity) from the access point AP to the third terminal STA3 based on the uplink channel information.

Here, a transmission interval between the frames 400, 401, 402, 403, 404, and 405 is set as SIFS, such that a station which does not participate in sounding can be prevented from interrupting sounding. Accordingly, robust transmission and reception of the NDP frames 401, 403, and 405 may be guaranteed.

The implicit sounding method may be used in place of the basic sounding method described above. When the implicit sounding method is used, the compressed beamforming frames 302, 304 and 306 are not transmitted. Accordingly, air time occupation due to the compressed beamforming frames 302, 304 and 306 does not occur. However, the estimated channel information may be different from the actual channel information due to actual transmission and reception modem even when the uplink and the downlink is assumed to be reciprocal. Accordingly, the implicit sounding method may have lower performance than the basic sounding method.

A case in which the above-described implicit sounding method is extended to an environment in which there are two BSSs will be described.

Figure 5:
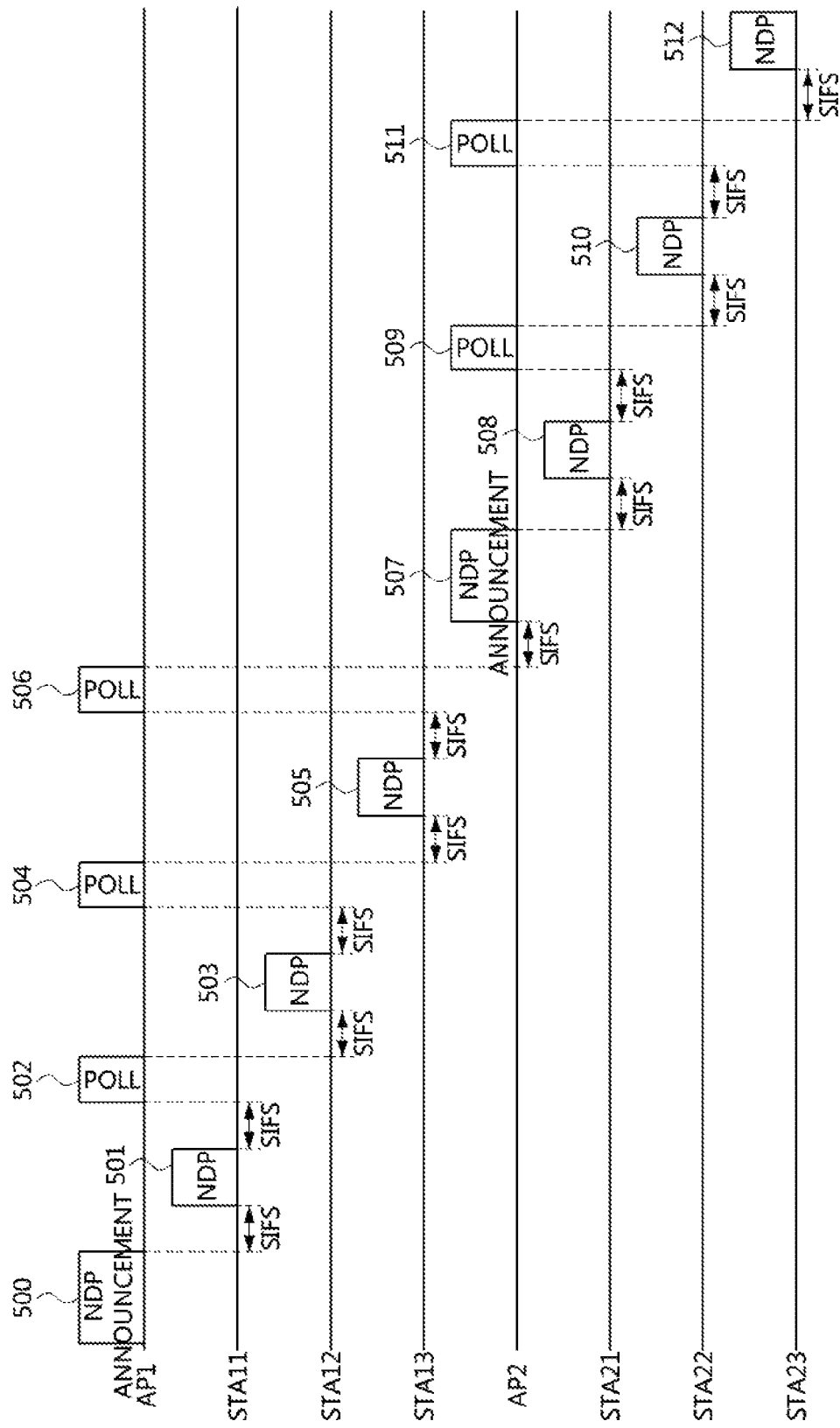
FIG. 5 is a conceptual diagram illustrating an implicit sounding method in an environment in which there are a plurality of BSSs.

FIG. 5 is a conceptual diagram illustrating the implicit sounding method in the environment in which there is a plurality of BSSs.

Referring to FIG. 5, a first access point AP1 may constitute BSS1 and each of a plurality of terminals STA11, STA12 and STA13 may belong to BSS1. Here, the first access point AP1 may be a beamformer, and each of the plurality of terminals STA11, STA12 and STA13 may be a beamformee. A second access point AP2 may constitute BSS2, and each of the plurality of terminals STA21, STA22 and STA23 may belong to BSS2. Here, the second access point AP2 may be a beamformer, and each of the plurality of terminals STA21, STA22 and STA23 may be a beamformee. Here, each of the plurality of access points AP1 and AP2 may be located within each other's coverage.

Here, functions and transmission and reception methods of the NDP announcement to frame 500, the NDP frames 501, 503 and 505, and the poll frames 502 and 504 may be the same as the functions and the transmission and reception methods of the NDP announcement frame 400, the NDP frames 401, 403 and 405, and the poll frames 402 and 404 described with reference to FIG. 4.

When the first access point AP1 receives the NDP frame 505 from the last third terminal STA13 among the plurality of terminals STA11, STA12 and STA13 belonging to BSS1, the first access point AP1 may transmit the poll frame 506 to the second access point AP2 after SIFS from a reception end time of the NDP frame 505. The first access point AP1 may trigger sounding of the second access point AP2 by transmitting the poll frame 506 to the second access point AP2.

When the second access point AP2 receives the poll frame 506, the second access point AP2 may perform sounding. Here, functions and transmission and reception methods of the NDP announcement frame 507, the NDP frames 508, 510 and 512, and the poll frames 509 and 511 may be the same as the functions and the transmission and reception methods of the NDP announcement frame 400, the NDP frames 401, 403 and 405, and the poll frames 402 and 404 described with reference to FIG. 4.

Meanwhile, when the plurality of access points AP1 and AP2 know their own MAC addresses, any frame using an MAC address may be used in place of the poll frame 506. For example, the beamforming report poll frames 303 and 305 used in the basic sounding method may be used in place of the poll frame 506. When there is information that should be transmitted with the poll frame 506, a new poll frame for this may be defined.

While the implicit sounding method has been described above on the assumption that the plurality of access points AP1 and AP2 are located within each other's coverage, the plurality of access points AP1 and AP2 may not be located within each other's coverage. If the plurality of access points AP1 and AP2 are not located within each other's coverage, and BSS1 and BSS2 are partially overlapped, the first access point AP1 may transmit the poll frame 506 to the second access point AP2 using an arbitrary terminal located in the overlapped area between the BSSs as a relay.

That is, the first access point AP1 may transmit the poll frame 506 to an arbitrary terminal located in the overlapped area between the BSSs, and the arbitrary terminal may transmit the poll frame 506 to the second access point AP2. In this case, it is assumed that the first access point AP1, the second access point AP2 and the arbitrary terminal know each other's existence. Here, the selection of the arbitrary terminal for relaying the poll frame 506 may be performed using a terminal selection method defined in advance regardless of the implicit sounding method.

Since the implicit sounding method in the environment in which there is a plurality of BSSs does not need the step of transmitting and receiving the beamforming frames 302, 304 and 306 compressed in the same way as the implicit sounding method in an environment in which there is one BSS, air time occupation due to the compressed beamforming frames 302, 304 and 306 does not occur. Particularly, when a basic sounding method is used to process an interference signal between BSSs, an amount of feedback of the channel information is exponentially increased according to the number of BSSs. Therefore, the implicit sounding method in the environment in which there is a plurality of BSSs may be more efficient than the basic sounding method.

Meanwhile, channel information for all stations is necessary for application of the interference alignment scheme. However, feedback for sharing correct channel information may act on a wireless LAN system as an overhead. Most interference alignment schemes need repetitive calculation since the schemes do not have a closed form solution, and complexity of calculation due to convergence and a repetition number of times should be considered to acquire desired performance.

An opportunistic interference alignment (OIA) scheme has been proposed to solve these problems. The opportunistic interference alignment scheme is a scheme based on an opportunistic beamforming scheme, a random beamforming scheme or the like proposed to use multiple user diversity in an existing cellular multi-cell interference fading channel environment. Further, an opportunistic scheduling scheme based on limited feedback has been proposed to reduce an overhead of feedback in multiple user diversity. However, in a scheme for multiple user diversity, a base station selects a terminal having a maximum signal strength based on limited feedback information, whereas in an opportunistic interference alignment scheme, a terminal minimizing the interference with other base stations is selected.

Meanwhile, the wireless LAN system is an environment in which a plurality of terminals having multiple antennas and a plurality of access points having multiple antennas are mixed, similarly to a cellular system. Since access points are connected to a wired network to transmit and receive Internet traffic, the access points may be assumed to be connected in a wired manner. Global channel information is necessary for application of the interference alignment scheme in such an environment. Therefore, the access point may acquire local channel information for at least one terminal connected to the access point, and transmit the acquired country channel information (that is, BSS channel information) to a central coordinator via a cable. Here, the central coordinator may calculate a beamforming vector for the interference alignment scheme based on the channel information acquired from at least one access point.

Here, since the terminals are not connected to each other in a wired or wireless manner, channel information of a link between the terminals may not be considered. A plurality of BSSs (that is, a plurality of access points) may be synchronized. Since the interference alignment scheme is applied for each of uplink and downlink, an environment in which the uplink and the downlink are mixed may not be considered.

In such an environment, the plurality of access points can improve the performance of the wireless LAN system in cooperation with each other. When an interference alignment scheme is used for improvement of the performance of the wireless LAN system, a reception station may divide a multi-dimensional signal vector space into a signal sub-space and an interference sub-space, and may cause a signal received from an unwanted transmission station to be in the interference sub-space and a signal received from a wanted transmission station to be in the signal sub-space. Accordingly, the reception station may detect a desired signal without being affected by the interference. For example, in uplink transmission, the access point can align the signal from the terminal belonging to its own BSS into the signal sub-space and the signal from the terminal belonging to the other BSS into the interference sub-space.

The data transmission and reception method based on the opportunistic interference alignment scheme may be greatly divided in four steps. In a first step, each of a plurality of access points may set an interference sub-space to be used by the access point and may transmit information regarding a signal sub-space which is a null space of the set interference sub-space to all terminals in a broadcast manner. In a second step, each of a plurality of terminals may acquire a signal transmitted in a broadcast manner from the access point belonging to another BSS, calculate a leakage of interference (LIF) to the access point belonging to the other BSS based on the acquired signal, and transmit the calculated leakage of interference to the access point connected to the terminal. In a third step, the access point may set a set of transmission terminals for simultaneously transmission in cooperation with another access point, and transmit the set of terminals in a broadcast manner to inform the terminal of the set. In a fourth step, the terminal included in the set of terminals may transmit a frame to the access point, and the access point may decode the frame received from the terminal included in the set of terminals.

The opportunistic interference alignment scheme may have some advantages. First, the access point only defines the interference sub-space, does not align an interference signal from the other BSS, and may use multiuser diversity to select a terminal of which the interference signal is small.

Second, the leakage of interference may vary with a vector transmitted by the terminal. Unlike existing beamforming scheme for maximizing a signal to noise ratio (SNR), a vector for minimizing interference with a station belonging to another BSS is designed, thereby minimizing the leakage of interference.

Third, each of a plurality of terminals has a metric called a leakage of interference. All terminals do not feed back their leakage of interference to the access point, but only a terminal of which the leakage of interference is smaller than a predetermined threshold attempts to feed back the leakage of interference, thereby preventing collision between the terminals. Fourth, since the leakage of interference has a smaller size than channel information transmitted in an existing interference alignment scheme, an overhead of the feedback may decrease. Fifth, since the plurality of access points can set a combination of terminals for simultaneous transmission based on the leakage of interference and the channel information through each other's cooperation, performance of the wireless LAN system can be improved.

Next, MAC protocol for an opportunistic interference alignment scheme will be described. Hereinafter, the interference alignment may be referred to as IA, the opportunistic interference alignment may be referred to as OIA, and the leakage of interference may be referred to as LIF.

Figure 6:
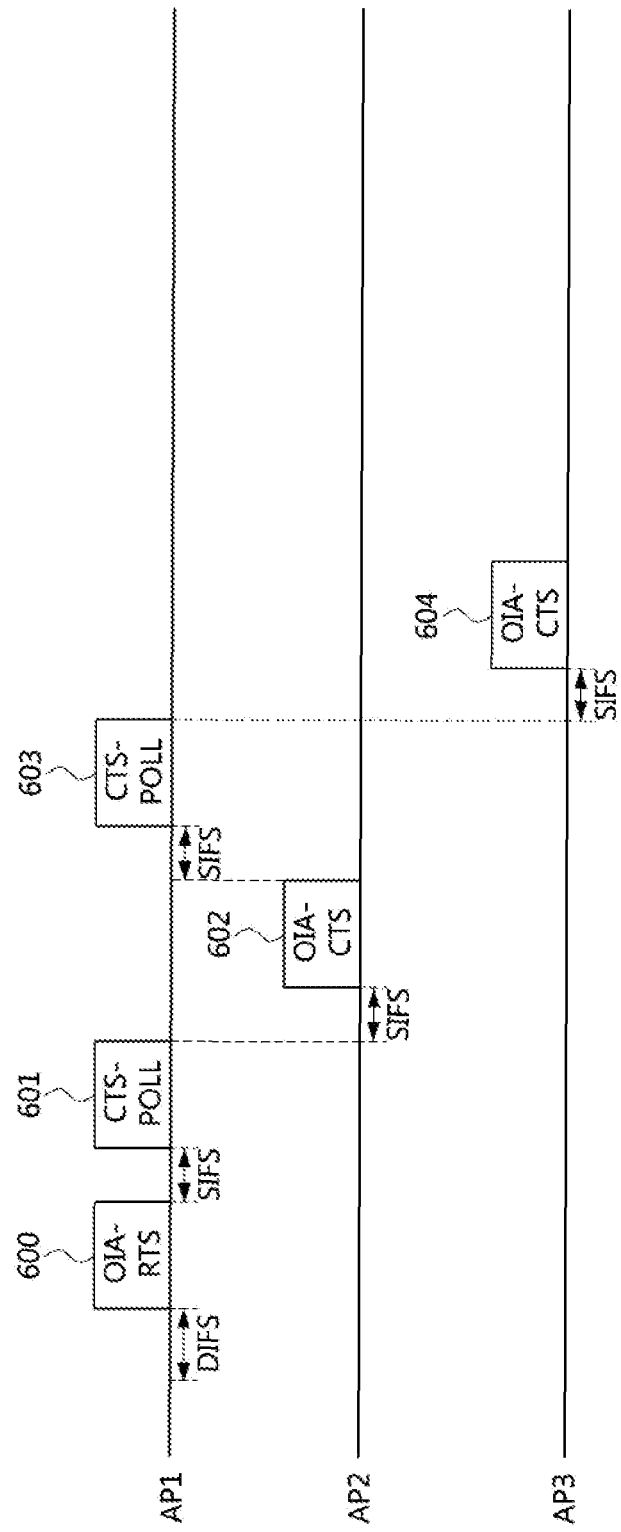
FIG. 6 is a conceptual diagram illustrating a method of determining an access point participating in OIA and an interference sub-space.

Method of Determining Access Point Participating in OIA and Interference Sub-Space FIG. 6 is a conceptual diagram illustrating a method of determining an access point participating in OIA and an interference sub-space.

Referring to FIG. 6, the first access point AP1 may constitute BSS1, the second access point AP2 may constitute BSS2, and the third access point AP3 may constitute BSS3. Each of a plurality of access points AP1, AP2 and AP3 may be located within each other's coverage or may be located outside the coverage. Each of the plurality of access points AP1, AP2 and AP3 may be connected in a wired or wireless manner. Here, the first access point AP1 may operate as a coordinator access point.

The first access point AP1 may generate an OIA candidate AP list including identification information (for example, a basic service set identifier (BSSID) or an MAC address) of each of the plurality of candidate access points AP2 and AP3 participating in OIA. Further, the first access point AP1 may set an interference sub-space of each of the plurality of access points included in the OIA candidate AP list. The first access point AP1 may generate an OIA-RTS frame 600 including the OIA candidate AP list, and information (for example, a vector) indicating the interference sub-space of each of the plurality of access points included in the OIA candidate AP list. When the channel is in an idle state during DIFS DCF, the first access point AP1 may transmit an OIA-RTS frame 600 after a contention window based on random backoff.

Meanwhile, the plurality of access points AP2 and AP3 receiving the OIA-RTS frame 600 may recognize that the CTS-poll frames 601 and 603 are transmitted to the access points later. The first access point AP1 may sequentially transmit the CTS-poll frames 601 and 603 to the plurality of access points AP2 and AP3 included in the OIA candidate AP list of the OIA-RTS frame 600. Here, the CTS-poll frames 601 and 603 may be frames for triggering transmission of the OIA-CTS frames 602 and 604.

The first access point AP1 may transmit the CTS-poll frame 601 to the second access point AP2 after SIFS from the transmission end time of the OIA-RTS frame 600. When the second access point AP2 receiving the CTS-poll frame 601 desires to participate in OIA, the second access point AP2 receiving the CTS-poll frame 601 may transmit the OIA-CTS frame 602 to the first access point AP1 after SIFS from a reception end time of the CTS-poll frame 601. On the other hand, when the second access point AP2 does not participate in OIA, the second access point AP2 may not transmit the OIA-CTS frame 602 to the first access point AP1. Here, the OIA-CTS frame 602 may include information indicating the signal sub-space that is a null space for interference sub-space of the second access point AP2.

When the first access point AP1 receives the OIA-CTS frame 602 from the second access point AP2, the first access point AP1 may recognize that the second access point AP2 participates in OIA and may recognize the signal sub-space of the second access point AP2. On the other hand, when the access points AP1 does not receive the OIA-CTS frame 602 from the second access point AP2 within SIFS from the transmission end time of the CTS-poll frame 601, the access points AP1 may transmit the CTS-poll frame 601 to the second access point AP2 after a point coordination function (PCF) inter frame space (PIFS) from the transmission end time of the CTS-poll frame 601 to request a response again or may transmit the CTS-poll frame 603 to the third access point AP3 that is the next access point included in the OIA candidate AP list.

The first access point AP1 may transmit the CTS-poll frame 603 to the third access point AP3 after SIFS from a reception end time of the OIA-CTS frame 602. When the third access point AP3 receiving the CTS-poll frame 603 desires to participate in OIA, the third access point AP3 receiving the CTS-poll frame 603 may transmit the OIA-CTS frame 604 to the first access point AP1 after SIFS from a reception end time of the CTS-poll frame 603. On the other hand, when the third access point AP3 does not participate in OIA, the third access point AP3 may not transmit the OIA-CTS frame 604 to the first access point AP1. Here, the OIA-CTS frame 604 may include information indicating a signal sub-space that is a null space for the interference sub-space of the third access point AP3.

When the first access point AP1 receives the OIA-CTS frame 604 from the third access point AP3, the first access point AP1 may recognize that the third access point AP3 participates in OIA and recognize the signal sub-space of the third access point AP3. Meanwhile, when the first access point AP1 does not receive the OIA-CTS frame 604 from the third access point AP3 within SIFS from the transmission end time of the CTS-poll frame 603, the first access point AP1 transmits the CTS-poll frame 603 to the third access point AP3 after PIFS from the transmission end time of the CTS-poll frame 603 to request a response again or may transmit a CTS-poll frame (not illustrated) to the next access point (for example, a fourth access point (not illustrated)) included in the OIA candidate AP list.

The first access point AP1 may generate an OIA participation AP list based on the response of the CTS-poll frames 601 and 603 transmitted to the plurality of candidates access points AP2 and AP3 included in the OIA candidate AP list. That is, the first access point AP1 may determine the access points AP2 and AP3 transmitting the OIA-CTS frames 602 and 604 which are responses to the CTS-poll frames 601 and 603 as last access points participating in OIA, and generate the OIA participation AP list including the identification information of the last access points. Here, the first access point AP1 may generate the OIA participation AP list including identification information of the first, second and access points AP1, AP2 and AP3.

The first, second or third the access points AP1, AP2 and AP3 may be determined as last access points participating in OIA using the above-described method, and the interference sub-space of each of the accesses points AP1, AP2 and AP3 participating in OIA may be determined. The method may be performed in a wired or wireless manner.

Sounding Method for OIA

Figure 7:
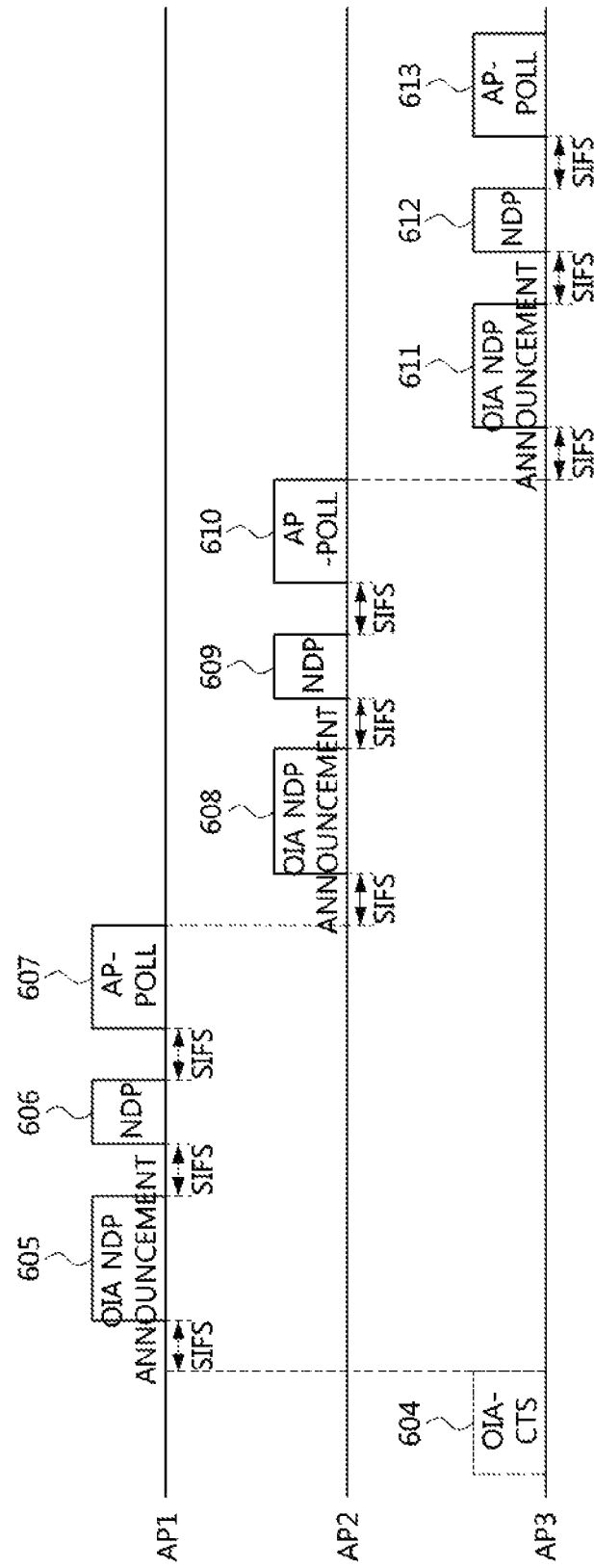
FIG. 7 is a conceptual diagram illustrating a sounding method for OIA.

FIG. 7 is a conceptual diagram illustrating a sounding method for OIA.

Here, the sounding method illustrated in FIG. 7 may be performed subsequently to the method of determining the access point participating in OIA and the interference sub-space illustrated in FIG. 6.

Referring to FIG. 7, a first access point AP1 may be the same as the first access point AP1 illustrated in FIG. 6, a second access point AP2 may be the same as the second access point AP2 illustrated in FIG. 6, and a third access point AP3 may be the same as the third access point AP3 illustrated in FIG. 6. Here, the first access point AP1 may operate as a coordinator access point.

The first access point AP1 may generates an OIA NDP announcement frame 605 including an OIA participation AP list, and information indicating a signal sub-space of each of the access points AP1, AP2 and AP3 included in the OIA participation AP list. The OIA NDP announcement frame 605 may not include the identification information of the terminal participating in OIA.

The first access point AP1 may transmit the OIA NDP announcement frame 605 in a broadcast manner after SIFS from a reception end time of the OIA-CTS frame 604. At least one terminal receiving the OIA NDP announcement frame 605 may recognize that the access points AP1, AP2 and AP3 participate in OIA based on information included in the OIA NDP announcement frame 605 and may recognize the signal sub-space of each of the access points AP1, AP2 and AP3. The terminal which is going to participate in OIA may recognize information (for example, an identification information or a signal sub-space) of each of the other access points AP2 and AP3 as well as the access point AP1 connected to the terminal based on the information included in the OIA NDP announcement frame 605. Therefore, when the terminal which is going to participate in OIA acquires the NDP frames 609 and 612 transmitted from the other access points AP2 and AP3, the terminal which is going to participate in OIA may calculate the leakage of interference to other access points AP2 and AP3 based on the acquired NDP frames 609 and 612.

Meanwhile, each of access points AP2 and AP3 participating in OIA may acquire the OIA NDP announcement frame 605 transmitted from the first access point AP1. In this case, based on information included in the OIA NDP announcement frame 605, each of the access points AP2 and AP3 may confirm that the access point participates in sounding and may transmit OIA NDP announcement frames 608 and 611 including the same information as the information included in the OIA NDP announcement frame 605 in a broadcast manner in its own sounding order. The sounding by each of the access points AP2 and AP3 that are not coordinator access points may be performed for hidden terminals.

The first access point AP1 may transmit the NDP frame 606 in a broadcast manner after SIFS from the transmission end time of the OIA NDP announcement frame 605. A long training field (LTF) indicating each stream in the NDP frame 606 may be generated as follows. The first access point AP1 may randomly select an orthogonal vector indicating the signal sub-space for each sounding, and define linear conversion beamforming corresponding to the selected orthogonal vector as a stream to be transmitted via a virtual antenna to thereby generate an LTF.

The first access point AP1 may transmit an AP-poll frame 607 to the second access point AP2 after SIFS from a transmission end time of the NDP frame 606. The first access point AP1 may trigger sounding of the second access point AP2 by transmitting the AP-poll frame 607 to the second access point AP2.

When the second access point AP2 receives the AP-poll frame 607, the second access point AP2 may transmit an OIA NDP announcement frame 608 in a broadcast manner after SIFS from a reception end time of the AP-poll frame 607. The second access point AP2 may transmit an NDP frame 609 in a broadcast manner after SIFS from a transmission end time of the OIA NDP announcement frame 608. The second access point AP2 may transmit an AP-poll frame 610 to the third access point AP3 after SIFS from a transmission end time of the NDP frame 609. Here, functions and transmission and reception methods of the OIA NDP announcement frame 608, the NDP frame 609, and the AP-poll frame 610 may be the same as the functions and the transmission and reception methods of the OIA NDP announcement frame 605, the NDP frame 606, and the AP-poll frame 607.

When the third access point AP3 receives the AP-poll frame 610, the third access point AP3 may transmit an OIA NDP announcement frame 611 in a broadcast manner after SIFS from a reception end time of the AP-poll frame 610. The third access point AP3 may to transmit an NDP frame 612 in a broadcast manner after SIFS from a transmission end time of the OIA NDP announcement frame 611. The third access point AP3 may transmit an AP-poll frame 613 to the first access point AP1 after SIFS from a transmission end time of the NDP frame 612. The third access point AP3 may inform that sounding ends by transmitting the AP-poll frame 613 to the first access point AP1. Here, functions and transmission and reception methods of the OIA NDP announcement frame 611, the NDP frame 612, and the AP-poll frame 613 may be the same as the functions and the transmission and reception methods of the OIA NDP announcement frame 605, the NDP frame 606, and the AP-poll frame 607.

Method of Feeding Back Leakage of Interference

The terminal participating in sounding may determine a transmission vector based on the NDP frames 606, 609 and 612 received from all the access points AP1, AP2 and AP3 participating in OIA. That is, the terminal may acquire channel information based on the NDP frames 606, 609 and 612 and determine the transmission vector based on at least one of the acquired pieces of channel information and a signal to interference noise ratio (SINR) for the NDP frames 606, 609 and 612. Further, the terminal may determine the transmission vector to minimize the leakage of interference.

The terminal may calculate the leakage of interference to the access point that is not connected the terminal based on the determined transmission vector. For example, the leakage of interference may refer to a size of a vector projected to the channel of the access point by the transmission vector.

Figure 8B:
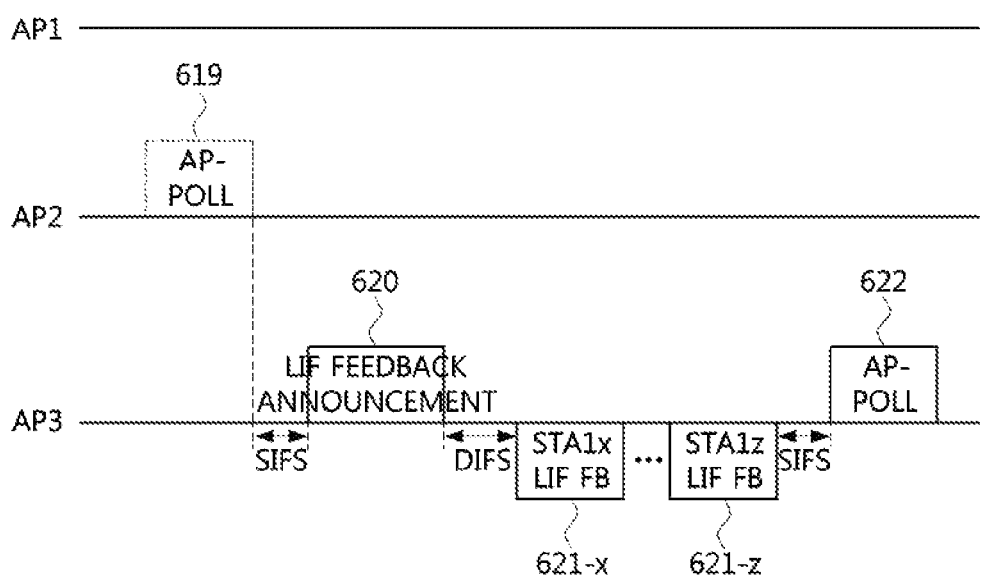

FIGS. 8A and 8B are conceptual diagrams illustrating a method of feeding back the leakage of interference.

Here, the method of feeding back a leakage of interference illustrated in FIGS. 8A and 8B may be performed continuously after the sounding method illustrated in FIG. 7.

Referring to FIGS. 8A and 8B, a first access point AP1 may be the same as the first access point AP1 illustrated in FIG. 7, a second access point AP2 may be the same as the second access point AP2 illustrated in FIG. 7, and a third access point AP3 may be the same as the third access point AP3 illustrated in FIG. 7. Here, the first access point AP1 may be a coordinator access point.

The first access point AP1 may generate a leakage of interference (LIF) feedback announcement frame 614. The LIF feedback announcement frame 614 may include a field indicating a range of a leakage of interference to be fed back, and a duration field indicating a period set to receive a feedback of the leakage of interference after the LIF feedback announcement frame 614. The first access point AP1 may transmit the LIF feedback announcement frame 614 to terminals connected to the first access point after SIFS from a reception end time of the AP-poll frame 613.

Each of the terminals STA1$x$ to STA1$z$ connected to the first access point AP1 may receive the LIF feedback announcement frame 614 and recognize the range of the leakage of interference to be fed back and the period set to receive the feedback the leakage of interference based on information included in the LIF feedback announcement frame 614. Each of the terminals STA1$x$ to STA1$z$ may transmit LIF feedback frames 615-$x$ to 615-$z$ when a sum of the leakages of interference (that is, a sum of the leakages of interference to the second access point AP2 and the third access point AP3 connected to the terminals) belongs to the range of the leakage of interference to be fed back. In this case, each of the terminals STA1$x$ to STA1$z$ may transmit the LIF feedback frames 615-$x$ to 615-$z$ in a broadcast manner after a contention window based on the random backoff if the channel is in an idle state during DIFS.

For channel estimation, each of the terminals STA1$x$ to STA1$z$ may omnidirectionally transmit a preamble of the LIF feedback frames 615-$x$ to 615-$z$ as in the NDP frame for the SU MIMO beamforming sounding defined in the IEEE 802.11ac standard, and perform beamforming on a payload of the LIF feedback frames 615-$x$ to 615-$z$ using the transmission vector determined based on the NDP frames 606, 609 and 612.

Each of the terminals STA1$x$ to STA1$z$ should transmit the LIF feedback frames 615-$x$ to 615-$z$ within the period set to receive a feedback of the leakage of interference. When the LIF feedback frames 615-$x$ to 615-$z$ is transmitted after the period set to receive a feedback of the leakage of interference lapses, the first access point AP1 may not receive the LIF feedback frames 615-$x$ to 615-$z$.

Here, the LIF feedback frames 615-$x$ to 615-$z$ may include, for example, a field indicating the leakage of interference, and a field indicating a size of uplink data. The field indicating the leakage of interference may indicate a leakage of interference of each of the access points AP2 and AP3 not connected to the terminals STA1$x$ to STA1$z$ or a sum of leakages of interference thereof. When the field indicating the leakage of interference of the access point indicates the leakage of interference of each of the access points AP2 and AP3, the leakage of interference of each of the access points AP2 and AP3 may be located in the field indicating the leakage of interference in an order of the access points included in the OIA participation AP list of the OIA NDP announcement frame 605.

When the terminals STA1$x$ to STA1$z$ do not receive the NDP frames 609 and 612 from the access points AP2 and AP3 not connected to the terminals, the terminals STA1$x$ to STA1$z$ do not calculate the leakage of interference to the access points AP2 and AP3. In this case, at least one bit of the field indicating a leakage of interference may be used to indicate that the leakage of interference to the access points AP2 and AP3 is not calculated. When the leakage of interference to the access points AP2 and AP3 is calculated to be 0, the field indicating the leakage of interference may be set to 0.

The field indicating the size of the uplink data may indicate a size of uplink data to be transmitted from the terminals STA1$x$ to STA1$z$ to the first access point AP1. The first access point AP1 may perform scheduling in consideration of the field indicating the size of the uplink data included in the LIF feedback frames 615-$x$ to 615-$z$.

Meanwhile, each of the access points AP2 and AP3 not connected to the terminals STA1$x$ to STA1$z$ may acquire the LIF feedback announcement frame 614 transmitted from the first access point AP1, and operate in the reception mode during a period indicated by the duration field included in the LIF feedback announcement frame 614. Each of the access points AP2 and AP3 may acquire the LIF feedback frames 615-$x$ to 615-$z$ transmitted from the terminals STA1$x$ to STA1$z$, and acquire information necessary for OIA from the LIF feedback frames 615-$x$ to 615-$z$.

When the first access point AP1 completes the reception of the LIF feedback frames 615-$x$ to 615-$z$ from the terminals STA1$x$ to STA1$z$, the first access point AP1 may transmit an AP-poll frame 616 to the second access point AP2. That is, the first access point AP1 may trigger the feedback of the second access point AP2 by transmitting the AP-poll frame 616 to the second access point AP2 after SIFS from a reception end time of the last LIF feedback frame 615-$z$.

When the second access point AP2 receives the AP-poll frame 616 from the first access points AP1, the second access point AP2 may transmit an LIF feedback announcement frame 617 in a broadcast manner after SIFS from a reception end time of the AP-poll frame 616. The terminals STA2$x$ to STA2$z$ connected to the second access point AP2 may receive the LIF feedback announcement frame 617, and transmit LIF feedback frames 618-$x$ to 618-$z$ after a contention window based on the random backoff if the channel is in an idle state during DIFS. When the second access point AP2 completes the reception of the LIF feedback frames 618-$x$ to 618-$z$ from the terminals STA2$x$ to STA2$z$, the second access point AP2 may transmit the AP-poll frame 619 to the third access point AP3 after SIFS from a reception end time of the last LIF feedback frame 618-$z$. Here, functions and transmission and reception methods of the LIF feedback announcement frame 617, the LIF feedback to frames 618-$x$ to 618-$z$, and the AP-poll frame 619 may be the same as the functions and the transmission and reception methods of the LIF feedback announcement frame 614, the LIF feedback frame 615-$x$ to 615-$z$, and the AP-poll frame 616.

When the third access point AP3 receives the AP-poll frame 619 from the second access points AP2, the third access point AP3 may transmit an LIF feedback announcement frame 620 in a broadcast manner after SIFS from a reception end time of the AP-poll frame 619. The terminals STA3$x$ to STA3$z$ connected to the third access point AP3 may receive the LIF feedback announcement frame 620, and transmit LIF feedback frames 621-$x$ to 621-$z$ after a contention window based on the random backoff if the channel is in an idle state during DIFS. When the third access point AP3 completes the reception of the LIF feedback frames 621-$x$ 621-$z$ from the terminals STA3$x$ to STA3$z$, the third access point AP3 may transmit an AP-poll frame 622 to the first access point AP1 after SIFS from a reception end time of the last LIF feedback frame 621-$z$. The third access point AP3 may inform that the feedback of the leakage of interference is completed by transmitting the AP-poll frame 622 to the first access point AP1. Here, functions and transmission and reception methods of the LIF feedback announcement frame 620, the LIF feedback frames 621-*x* to 621-*z*, and the AP-poll frame 622 may be the same as the functions and the transmission and reception methods of the LIF feedback announcement frame 614, the LIF feedback frame 615-*x* to 615-*z*, and the AP-poll frame 616.

When the number of terminals feeding back a leakage of interference through a procedure of feeding back a leakage of interference is small, each of the access points AP1, AP2 and AP3 may repeatedly perform the procedure of feeding back a leakage of interference.

In this case, each of the access points AP1, AP2 and AP3 may repeatedly perform the procedure of feeding back a leakage of interference while gradually changing a range of the leakage of interference to be fed back. The number of times the procedure of feeding back a leakage of interference is performed, and the range of the leakage of interference to be fed back may be set through cooperation between the access points AP1, AP2 and AP3 in advance.

Next, a configuration for improving the performance of the OIA in the method of feeding back a leakage of interference described above will be described in greater detail. Here, the configuration for improving the performance of OIA will be described based on an operation of stations belonging to BSS1. However, this may be similarly applied to stations belonging to BSS2 and stations belonging to BSS3.

When the terminals STA1*x* to STA1*z* feed back the leakage of interference, the terminals STA1*x* to STA1*z* may basically transmit a leakage of interference obtained by representing a sum of sizes of interference with the other access points AP2 and AP3 using a scalar value to the first access point AP1. In practice, the terminals STA1*x* to STA1*z* may estimate the channel information from each of the other access points AP2 and AP3, determine a transmission vector based on the estimated channel information, and calculate the leakage of interference of each of the other access points AP2 and AP3 based on the determined transmission vector.

However, when the sum of the leakages of interference of other access points AP2 and AP3 is transmitted to the first access point AP1, the first access point AP1 cannot recognize the access point for which the leakage of interference is relatively larger or smaller among the access points AP2 and AP3. For example, when the leakage of interference of the second access point AP2 is relatively larger and the leakage of interference of the third access point AP3 is relatively smaller, this may indicate that the terminals STA1*x* to STA1*z* are under influence of the second access point AP2. From the viewpoint of fairness of scheduling, if the sum of leakages of interference is the same, it may be advantageous to select the terminals STA1*x* to STA1*z* under influence of all access points rather than the terminals STA1*x* to STA1*z* under influence of a specific access point.

Furthermore, when the leakage of interference of each of the access points AP2 and AP3 is included in the LIF feedback frames 615-*x* to 615-*z*, there is a small increase in amount of feedback. For example, when the number of BSSs to which OIA is applied is 4, the terminals STA1*x* to STA1*z* may feed back the leakage of interference of the three BSS other than the BSS to which the terminals belong. That is, when the leakage of interference of each of the four BSSs is fed back, an amount of feedback is increased 3 times in comparison with a case in which a total leakage of interference of the four BSSs is fed back. If a total leakage of interference is quantized at 8 bits (that is, 1 byte) and then transmitted, the leakage of interference of each of the four BSSs may be quantized at 3 bytes and then transmitted. This means that an amount of feedback for OIA increases linearly as the number of BSSs increases, and thus, is more advantageous than IA in which the amount of feedback exponentially increases as the number of BSSs increases. Therefore, the field indicating the leakage of interference may include the leakage of interference of each of the access points AP2 and AP3 not connected to the terminals STA1*x* to STA1*z*.

Meanwhile, since OIA uses multi-user diversity in spite of its several advantages, there should be many terminals in order to guarantee the performance to some extent. As a simulation result of the OIA, when there are ten or more terminals, an effect of improvement of the performance is achieved, and is excellent as the number of terminals increases. On the other hand, when the performance of the OIA is not guaranteed due to a small number of terminals, it may be effective to feed back the channel information, unlike conventional OIA. Here, the channel information may be channel information between the terminal and the access point belonging to an adjacent BSS.

That is, when the performance of OIA is not guaranteed due to a small number of terminals, an existing IA may be performed in place of OIA based on the estimated channel information, and even when OIA is performed, the access point can improve SNR through reception beamforming based on the estimated channel information. In this case, the SNR of the received frame can be improved in comparison with the existing OIA. Or, the access point may detect a desired signal using an interference signal processing scheme such as a successive interference cancellation (SIC) scheme. Therefore, the terminals STA1*x* to STA1*z* may transmit the LIF feedback frames 615-*x* to 615-*z* to the access point belonging to the adjacent BSS as well as the access point connected with the terminals.

Meanwhile, when the terminals STA1*x* to STA1*z* have multiple antennas, the terminals STA1*x* to STA1*z* should transmit the LIF feedback frames 615-*x* to 615-*z* including LTF so that channel information corresponding to the number of antennas can be estimated. The LIF feedback frames 615-*x* to 615-*z* including LTF may have the same form as the NDP frame for SU MIMO beamforming sounding defined in the IEEE 802.11ac standard. The LIF feedback frames 615-*x* to 615-*z* may further include a payload, unlike the NDP frame. Since the LIF feedback frame is transmitted after the sounding procedure, the LIF feedback frame may be subjected to beamforming using a transmission vector according to a sounding result.

FIG. 9 is a block diagram illustrating one example embodiment of the LIF feedback frame.

Referring to FIG. 9, the LIF feedback frame 900 may include a preamble and a payload. The preamble of the LIF feedback frame 900 may include a legacy-short training field (L-STF) 901, a legacy-long training field (L-LTF) 902, a legacy-signal (L-SIG) field 903, a very high throughput-signal-A1 (VHT-SIG-A1) field 904, a very high throughput-signal-A2 (VHT-SIG-A2) field 905, a VHT-STF 906, and VHT-LTF1 907-1 to VHT-LTFN 907-N. The preamble of the LIF feedback frame 900 may be omnidirectionally transmitted without beamforming, like the NDP frame.

The payload of the LIF feedback frame 900 may include a service field 908, a data field 909, and a tail and padding field 910. The payload of the LIF feedback frame 900 may be transmitted in a beamforming manner.

On the other hand, only a legacy preamble portion of the data frame may be omnidirectionally transmitted for a legacy station in SU/MU MIMO defined in the IEEE 802.11ac standard, and a VHT preamble and the like of the data frame may be transmitted in a beamforming manner since they have been already subjected to sounding.

Method of Selecting a Terminal Participating in OIA

Figure 10:
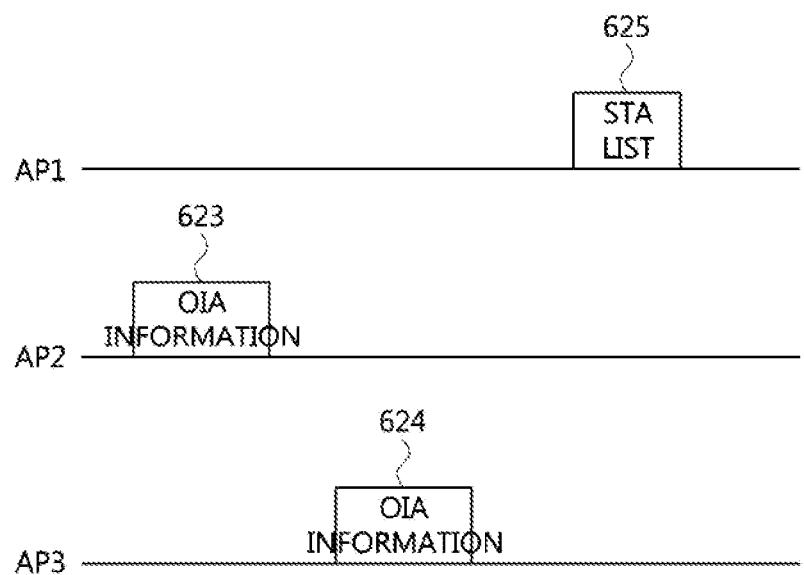
FIG. 10 is a conceptual diagram illustrating a method of selecting a terminal participating in OIA.

FIG. 10 is a conceptual diagram illustrating a method of selecting a terminal participating in OIA.

Here, the method of selecting a terminal participating in OIA illustrated in FIG. 10 may be performed subsequently to the method of feeding back a leakage of interference illustrated in FIGS. 8A and 8B.

Referring to FIG. 10, a first access point AP1 may be the same as the first access point AP1 illustrated in FIGS. 8A and 8B, a second access point AP2 may be the same as the second access point AP2 illustrated in FIGS. 8A and 8B, and a third access point AP3 may be the same as the third access point AP3 illustrated in FIGS. 8A and 8B. Here, the first access point AP1 may be a coordinator access point.

Each of the access points AP1, AP2 and AP3 may confirm a leakage of interference and estimate channel information based on the LIF feedback frame received from a terminal connected to the access point. Further, each of the access points AP1, AP2 and AP3 may confirm a leakage of interference and estimate channel information based on an IL feedback frame received from a terminal not connected to the access point.

Each of the access points AP1, AP2 and AP3 may process a signal using two schemes based on the leakage of interference and the estimated channel information. In a first scheme, each of the access points AP1, AP2 and AP3 may estimate the channel information based on the LIF feedback frame, and thus, may transmit and receive a data frame based on existing IA rather than OIA. Therefore, the first access point AP1 may acquire the estimated channel information from the other access points AP2 and AP3 and may calculate a precoding matrix for interference alignment based on the channel information. The first scheme may be used for downlink transmission according to channel reciprocity.

According to a second scheme, the channel information is additionally used in OIA, and thus, SNR for the signal can be improved. That is, each of the access points AP1, AP2 and AP3 additionally uses the channel information when OIA is applied, such that the SNR for a desired signal can be improved and a desired signal can be detected using an interference signal processing scheme such as a successive interference cancellation (SIC) scheme. According to the second scheme, performance of the OIA-based uplink transmission can be improved. Hereinafter, the second scheme will be described in detail.

Each of the access points AP1, AP2 and AP3 may preferentially select a terminal having a small leakage of interference among the terminals connected to the access point and estimate an SINR for a combination of the terminals. Further, each of the access points AP1, AP2 and AP3 may estimate SINR for some terminals rather than a combination of all terminals connected to the access point. For example, each of the access points AP1, AP2 and AP3 may give priority to a leakage of interference fed back from the terminal connected to the access point, a leakage of interference caused by a terminal connected to the access point, a strength of a received signal from the terminal connected to the access point, or the like in this order, and select a plurality of terminals having a small value of each item. Each of the access points AP1, AP2 and AP3 may estimate the SINR for a combination of the selected terminals. Further, when each of the access points AP1, AP2 and AP3 estimates the SINR, the access point may estimate the SINR on the assumption that reception beamforming is performed.

Each of the access points AP1, AP2 and AP3 may select at least one terminal combination (that is, a combination of candidate terminals participating in OIA) according to an order of increasing estimated SINR, and may generate an OIA candidate STA list including identification information of the terminals included in the selected terminal combination. The second access point AP2 may generate an OIA information frame 623 including the OIA candidate STA list, information necessary for OIA, or the like, and transmit the OIA information frame 623 to the first access point AP1 in a wired or wireless manner. Further, the third access point AP3 may generate an OIA information frame 624 including the OIA candidate STA list, information necessary for OIA, or the like, and transmit the OIA information frame 624 to the first access point AP1 in a wired or wireless manner.

The first access point AP1 may select the last terminal participating in OIA based on the information included in the OIA information frames 623 and 624, and generate an OIA participation STA list including the identification information of the selected last terminal. That is, the first access point AP1 may generate the OIA participation STA list in consideration of performance of the wireless LAN system, a total SINR, scheduling, size information of uplink data included in LIF feedback frames 615-$x$ to 615-$z$, a latency of traffic, or the like. Here, when there are a plurality of combinations of last terminals participating in OIA, the first access point AP1 may generate a plurality of OIA participation STA lists.

The first access point AP1 may generate the OIA participation STA list including a terminal combination having a largest sum of SINRs in consideration of the performance of the wireless LAN system. This considers interference cancellation performance based on the estimated channel information as well as the leakage of interference, such that the performance can be improved.

In addition, the first access point AP1 may generate the OIA participation STA list in consideration of a maximizing scheduling scheme of maximizing the number of terminals with a maximum throughput, a minimizing scheduling scheme of minimizing the number of terminals with a minimum throughput, or a proportional fair scheduling scheme that is an intermediate scheme of the maximizing scheduling scheme and the minimizing scheduling scheme.

Further, the first access point AP1 may generate both of an OIA participation STA list including at least one terminal located in a completely overlapped area, and an OIA participation STA list including at least one terminal located in a partially overlapped area. The at least one terminal located in the partially overlapped area may belong to a smaller number of BSSs than the at least one terminal located in the completely overlapped area. Therefore, the at least one terminal located in the partially overlapped area may be more advantageous than the at least one terminal located in the completely overlapped area in application of an IA and an OIA.

Meanwhile, the first access point AP1 may transmit an STA list frame 625 including the OIA participation STA list to the second access point AP2 and the third access point AP3 in a wired or wireless manner. When there are a plurality of OIA participation STA lists, the STA list frame 625 may include transmission order information of the OIA participation STA lists as well as the plurality of OIA participation STA lists.

OIA-Based Data Frame Transmission and Reception Method

Figure 11A:
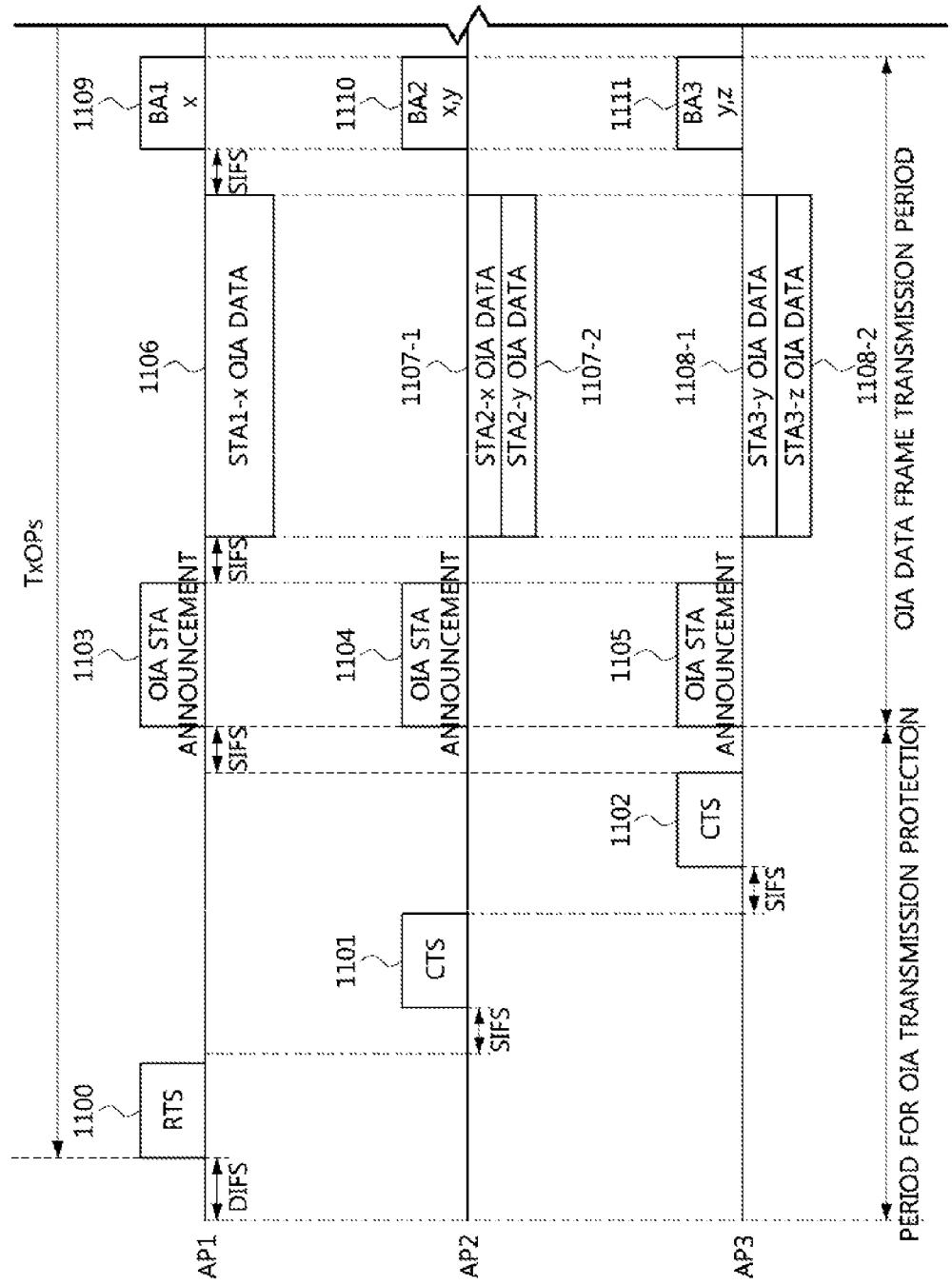
FIGS. 11A and 11B are conceptual diagrams illustrating an OIA-based data frame transmission and reception method.
Figure 11B:
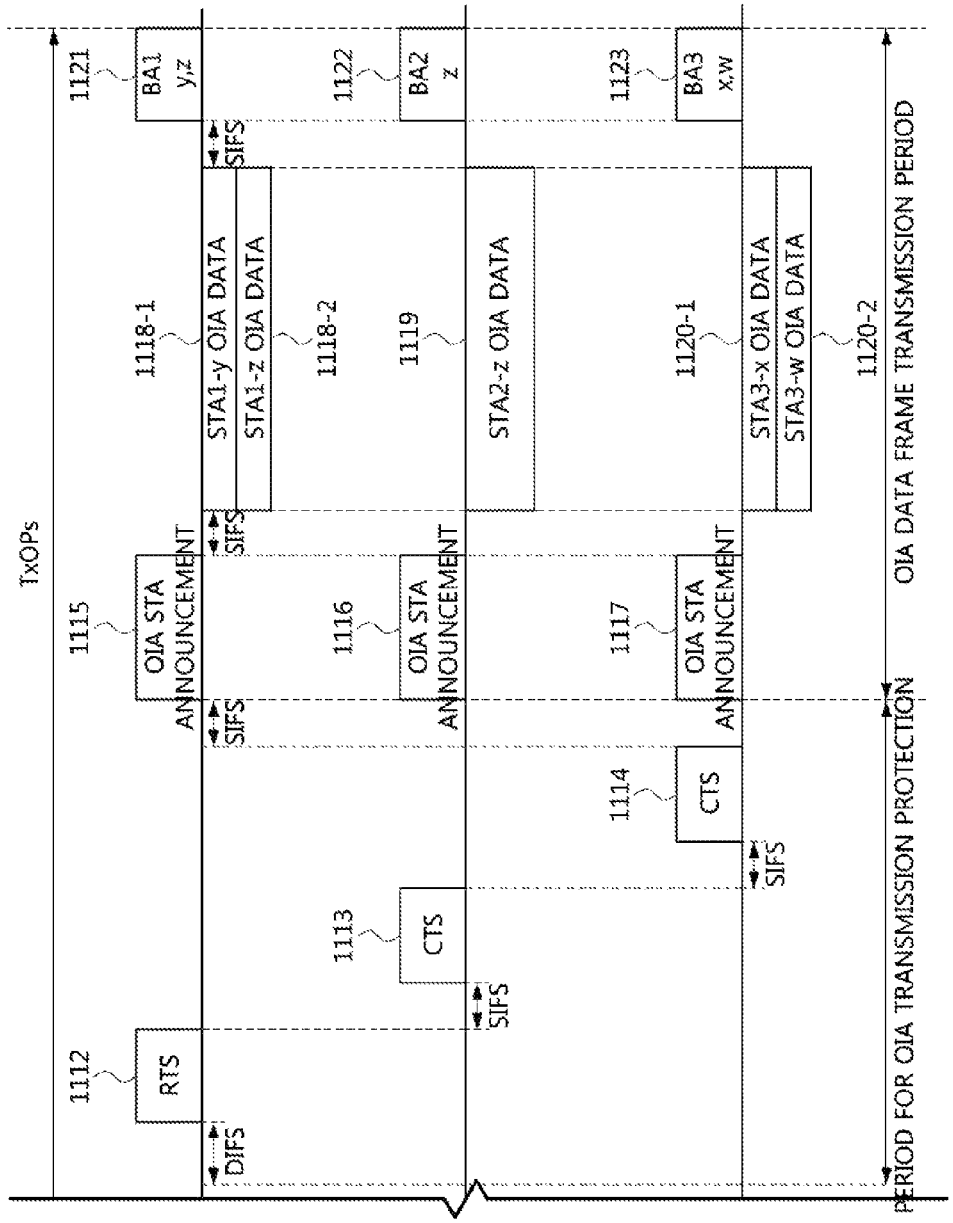

FIGS. 11A and 11B are conceptual diagrams illustrating an OIA-based data frame transmission and reception method.

Here, the OIA-based data frame transmission and reception method illustrated in FIGS. 11A and 11B may be performed subsequently to the method of selecting a terminal to participate in OIA illustrated in FIG. 10.

Referring to FIGS. 11A and 11B, a first access point AP1 may be the same as the first access point AP1 illustrated in FIG. 10, a second access point AP2 may be the same as the second access point AP2 illustrated in FIG. 10, and a third access point AP3 may be the same as the third access point AP3 illustrated in FIG. 10. Here, the first access point AP1 may be a coordinator access point.

After setting TxOP, the first access point AP1 may perform the OIA-based data transmission and reception method. First, each of the access points AP1, AP2 and AP3 may perform a procedure of exchange between an RTS frame 1100 and CTS frames 1101 and 1102 so as to protect transmission of data frames 1106, 1107-1, 1107-2, 1108-1, and 1108-2. When a channel is in an idle state during DIFS, the first access point AP1 may transmit the RTS frame 1100 after a contention window based on random backoff. The RTS frame 1100 may include a list (that is, OIA participation AP list) of access points to transmit the CTS frames 1101 and 1102 which are responses to the RTS frame 1100. An order of the access points AP1 and AP2 described in the OIA participation AP list may be an order of transmission of the CTS frames 1101 and 1102.

The second access point AP2 receiving the RTS frame 1100 may confirm that the second access point AP2 among the access points AP2 and AP3 is set to first transmit the CTS frame 1101 based on the information included in the RTS frame 1100. Therefore, the second access point AP2 may transmit the CTS frame 1101 after SIFS from a reception end time of the RTS frame 1100.

The third access point AP3 receiving the RTS frame 1100 may confirm that the third access point AP3 among the access points AP2 and AP3 is set to transmit the CTS frame 1102 subsequently to the second access point AP2 based on the information included in the RTS frame 1100. Therefore, the third access point AP3 may transmit the CTS frame 1102 after SIFS from a reception end time of the CTS frame 1101.

When the procedure of exchanging between the RTS frame 1100 and the CTS frames 1101 and 1102 is completed, each of the access points AP1, AP2 and AP3 may announce the list of terminals participating in OIA (that is, an OIA participation STA list). That is, each of the access points AP1, AP2 and AP3 may transmit OIA STA announcement frames 1103, 1104, and 1105 after SIFS from a transmission end time of the CTS frame 1102. The OIA STA announcement frames 1103, 1104, and 1105 may include the OIA participation STA list (that is, including STA1-$x$, STA2-$x$, STA2-$y$, STA3-$y$, and STA3-$z$), transmission-available section information of the data frames 1106, 1107-1, 1107-2, 1108-1, and 1108-2, or the like.

The terminals STA1-$x$, STA2-$x$, STA2-$y$, STA3-$y$, and STA3-$z$ participating in OIA may successfully decode the OIA STA announcement frames 1103, 1104, and 1105 using the interference signal processing scheme such as an interference cancellation scheme. When it is determined that it is difficult for the OIA STA announcement frames 1103, 1104, and 1105 to be successfully decoded by the terminals STA1-$x$, STA2-$x$, STA2-$y$, STA3-$y$, and STA3-$z$ due to limited performance of the terminals STA1-$x$, STA2-$x$, STA2-$y$, STA3-$y$, and STA3-$z$, each of the access points AP1, AP2 and AP3 may simultaneously transmit the OIA STA announcement frames 1103, 1104, and 1105 in the same form. In this case, a transmitter address included in each of the OIA STA announcement frames 1103, 1104, and 1105 may be set as an address of the first access point AP1.

The terminals STA1-$x$, STA2-$x$, STA2-$y$, STA3-$y$, and STA3-$z$ may recognize that the terminals participate in OIA through the OIA STA announcement frames 1103, 1104, and 1105 and generate data frames 1106, 1107-1, 1107-2, 1108-1, and 1108-2 based on the transmission-available section information of the data frames 1106, 1107-1, 1107-2, 1108-1, and 1108-2 included in the OIA STA announcement frames 1103, 1104, and 1105. For example, when a length of the data frames 1106, 1107-1, 1107-2, 1108-1, and 1108-2 to be transmitted is smaller than a length indicated by the transmission-available section information of the data frames 1106, 1107-1, 1107-2, 1108-1, and 1108-2, the terminals STA1-$x$, STA2-$x$, STA2-$y$, STA3-$y$, and STA3-$z$ may add padding. On the contrary, when the length of the data frames 1106, 1107-1, 1107-2, 1108-1, and 1108-2 to be transmitted is larger than the length indicated by the transmission-available section information of the data frames 1106, 1107-1, 1107-2, 1108-1, and 1108-2, the terminals STA1-$x$, STA2-$x$, STA2-$y$, STA3-$y$, and STA3-$z$ may segment the data frames 1106, 1107-1, 1107-2, 1108-1, and 1108-2.

The terminals STA1-$x$, STA2-$x$, STA2-$y$, STA3-$y$, and STA3-$z$ may transmit the data frames 1106, 1107-1, 1107-2, 1108-1, and 1108-2 in a beamforming manner after SIFS from a reception end time of the OIA STA announcement frames 1103, 1104, and 1105. Each of the access points AP1, AP2 and AP3 may receive the data frames 1106, 1107-1, 1107-2, 1108-1, and 1108-2, detect a desired signal from the data frames 1106, 1107-1, 1107-2, 1108-1, and 1108-2 using the interference signal processing scheme such as a successive interference cancellation (SIC), and decode the signal.

Each of the access points AP1, AP2 and AP3 may inform the terminals STA1-$x$, STA2-$x$, STA2-$y$, STA3-$y$, and STA3-$z$ of whether the data frames 1106, 1107-1, 1107-2, 1108-1, and 1108-2 are successfully received by transmitting block acknowledgement (ACK) (BA) frames 1109, 1110, and 1111 after SIFS from a reception end time of the data frames 1106, 1107-1, 1107-2, 1108-1, and 1108-2. When there is a terminal having no interference signal cancellation capability among the terminals STA1-$x$, STA2-$x$, STA2-$y$, STA3-$y$, and STA3-$z$, each of the access points AP1, AP2 and AP3 may transmit the block ACK frames 1109, 1110, and 1111 using a low MCS.

Meanwhile, the second access point AP2 may transmit a block ACK frame 1110 in an MU MIMO scheme because it is necessary for the second access point AP2 to transmit the block ACK frame 1110 to a plurality of terminals STA2-$x$ and STA2-$y$. In this case, the second access point AP2 may perform precoding on the block ACK frame 1110 to transmit the block ACK frame 1110. Further, the third access point AP3 may transmit a block ACK frame 1111 in an MU MIMO scheme because it is necessary for the third access point AP3 to transmit the block ACK frame 1111 to the plurality of terminals STA3-$y$ and STA3-$z$. In this case, the third access point AP3 may perform precoding on the block ACK frame 1111 to transmit the block ACK frame 1111.

After the terminals STA1-$x$, STA2-$x$, STA2-$y$, STA3-$y$, and STA3-$z$ may receive the block ACK frames 1109, 1110, and 1111, detect a desired signal from the block ACK frames 1109, 1110, and 1111 using the interference signal processing scheme such as a successive interference cancellation (SIC) scheme, and decode the signal.

As described above, a transmission and reception procedure of the data frames 1118-1, 1118-2, 1119, 1120-1, 1120-2 for another combination of the terminals STA1-*y*, STA1-*z*, STA2-*z*, STA3-*x*, and STA3-*w* may be performed after the transmission and reception procedure of the data frames 1106, 1107-1, 1107-2, 1108-1, and 1108-2 for one combination of the terminals STA1-*x*, STA2-*x*, STA2-*y*, STA3-*y*, and STA3-*z* is completed. Here, functions and transmission and reception methods of the RTS frame 1112, the CTS frames 1113 and 1114, the OIA STA announcement frames 1115, 1116 and 1117, the data frames 1118-1, 1118-2, 1119, 1120-1 and 1120-2, and the block ACK frames 1121, 1122 and 1123 may be the same as the functions and transmission and reception methods of the RTS frame 1100, the CTS frames 1101 and 1102, the OIA STA announcement frames 1103, 1104 and 1105, the data frames 1106, 1107-1, 1107-2, 1108-1 and 1108-2, and the block ACK frames 1109, 1110 and 1111.

Meanwhile, as described above, each of the access points AP1, AP2 and AP3 may perform IA or interference nulling through cooperation between the access points AP1, AP2 and AP3 when the access point knows the channel information for the terminal belonging to the adjacent BSS. Further, each of the access points AP1, AP2 and AP3 may apply a precoding matrix acquired through the IA or the interference nulling to downlink transmission according to the channel reciprocity. According to this method, since each of the access points AP1, AP2 and AP3 may transmit a pre-encoded signal, a terminal having no interference signal processing capability can decode a desired signal without performing a complicated interference signal processing procedure. Further, each of the access points AP1, AP2 and AP3 that do not perform a sounding procedure for IA of the downlink may perform IA for the downlink based on a result of the sounding for OIA of the uplink. That is, the performance can be improved by applying IA to the block ACK frames 1109, 1110, 1111, 1121, 1122, and 1123 transmitted through the downlink.

The example embodiments of the present invention described above propose the sounding method and the scheduling method for data frame transmission and reception according to the interference signal processing scheme such as an interference alignment scheme in an environment in which a plurality of BSSs are overlapped and interfered with each other. According to the example embodiments of the present invention, the plurality of stations may process an interference signal in cooperation with each other. Further, the performance of the wireless LAN system can be improved since the interference is mitigated in the same channel even when the plurality of stations transmit and receive frames.

The example embodiments of the present invention may be implemented in the form of program instructions executable through various computer means and recorded in a computer-readable medium. The computer-readable medium may include program instructions, data files, data structures, etc., alone or in combination. The program instructions recorded in the computer-readable medium may be specially designed and formed for the example embodiments of the present invention, or may be known to and used by those skilled in the art of the computer software field.

The computer-readable medium may be a hardware device specially configured to store and execute program instructions, such as a read only memory (ROM), a random access memory (RAM), or a flash memory. The hardware device may be configured to operate as at least one software module to perform the operation according to example embodiments of the present invention, and vice versa. The program instruction may be mechanical codes as made by a compiler, as well as high-level language codes executable by a computer based on an interpreter or the like.

While the example embodiments of the present invention and their advantages have been described in detail, it should be understood that various changes, substitutions and alterations may be made herein without departing from the scope of the invention.

What is claimed is:

1. A determining method of a signal sub-space for opportunistic interference alignment (OIA) performed in a first access point, the determining method comprising:
    transmitting a request to send (RTS) frame, the RTS frame including an OIA candidate access point (AP) list that includes identification information of a plurality of access points that are candidates for participating in the OIA;
    sequentially transmitting a clear to send (CTS)-poll frame for triggering transmission of a CTS frame to each of the plurality of access points in the OIA candidate AP list; and
    receiving a CTS frame which is a response to a CTS-poll frame from a second access point in the OIA candidate AP list when the second access point participates in the OIA.

2. The determining method according to claim 1, further comprising:
    generating an OIA participation AP list including identification information of a multiplicity of access points each transmitting a CTS frame to the first access point, the multiplicity of access points participating in the OIA.

3. The determining method according to claim 1, wherein the RTS frame further includes information indicating an interference sub-space of each of the plurality of access points.

4. The determining method according to claim 1, wherein the CTS frame further includes information indicating a signal sub-space of the second access point.

5. The determining method according to claim 2, further comprising:
    transmitting a null data packet (NDP) announcement frame, the NDP announcement frame including the OIA participation AP list;
    transmitting an NDP frame;
    transmitting an AP-poll frame for triggering sounding to a first one of the multiplicity of access points in the OIA participation AP list;
    receiving an AP-poll frame indicating that sounding is completed from a last one of the multiplicity of access points in the OIA participation AP list.

6. The determining method according to claim 5, wherein the NDP announcement frame further includes information indicating a signal sub-space of each of the multiplicity of access points participating in OIA.

* * * * *